US011089588B2

(12) United States Patent
Futaki et al.

(10) Patent No.: US 11,089,588 B2
(45) Date of Patent: Aug. 10, 2021

(54) RADIO COMMUNICATION SYSTEM, BASE STATION APPARATUS, RADIO TERMINAL, AND COMMUNICATION CONTROL METHOD

(71) Applicant: NEC Corporation, Tokyo (JP)

(72) Inventors: Hisashi Futaki, Tokyo (JP); Hiroto Sugahara, Tokyo (JP); Hiroaki Aminaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/969,443

(22) Filed: May 2, 2018

(65) Prior Publication Data

US 2018/0255545 A1 Sep. 6, 2018

Related U.S. Application Data

(63) Continuation of application No. 15/028,915, filed as application No. PCT/JP2014/002423 on May 7, 2014, now Pat. No. 10,721,728.

(30) Foreign Application Priority Data

Oct. 31, 2013 (JP) .................................. 2013-227473

(51) Int. Cl.
*H04W 72/04* (2009.01)
*H04W 28/08* (2009.01)
(Continued)

(52) U.S. Cl.
CPC .......... *H04W 72/0426* (2013.01); *H04B 7/02* (2013.01); *H04L 5/001* (2013.01);
(Continued)

(58) Field of Classification Search
CPC . H04W 72/0426; H04W 76/15; H04W 16/32; H04W 24/10; H04W 28/08;
(Continued)

(56) References Cited

U.S. PATENT DOCUMENTS

2009/0225711 A1  9/2009  Sammour et al.
2011/0009147 A1  1/2011  Morita et al.
(Continued)

FOREIGN PATENT DOCUMENTS

GB      2499774 A       9/2013
JP      2013-042310 A   2/2013
(Continued)

OTHER PUBLICATIONS

Non-final Office Action U.S. Appl. No. 15/028,915, dated Oct. 23, 2018, in the United States Patent and Trademark Office.
(Continued)

*Primary Examiner* — Hardikkumar D Patel

(57) ABSTRACT

A radio communication system includes a first base station that manages a first cell (110), a second base station (12) that manages a second cell (120), and a radio terminal (2). The radio terminal (2) supports dual connectivity involving a bearer split in which a first network bearer between the radio terminal (2) and a core network (3) is split over the first base station (11) and the second base station (12). The first base station (11) receives, from the second base station (12), bearer split status information about communication of the first network bearer in the second base station (12), and performs control of an access stratum related to the first network bearer. It is thus possible to contribute, for example, to an improvement in control of an access stratum when dual connectivity involving a bearer split is performed.

9 Claims, 17 Drawing Sheets

(51) Int. Cl.
| | |
|---|---|
| *H04L 5/00* | (2006.01) |
| *H04W 76/15* | (2018.01) |
| *H04B 7/02* | (2018.01) |
| *H04W 16/32* | (2009.01) |
| *H04W 92/20* | (2009.01) |
| *H04W 24/10* | (2009.01) |
| *H04W 52/36* | (2009.01) |
| *H04W 72/08* | (2009.01) |
| *H04W 72/12* | (2009.01) |
| *H04W 52/14* | (2009.01) |
| *H04W 88/06* | (2009.01) |

(52) U.S. Cl.
CPC .......... *H04L 5/0091* (2013.01); *H04W 16/32* (2013.01); *H04W 24/10* (2013.01); *H04W 28/08* (2013.01); *H04W 28/085* (2013.01); *H04W 52/367* (2013.01); *H04W 72/085* (2013.01); *H04W 72/12* (2013.01); *H04W 76/15* (2018.02); *H04W 92/20* (2013.01); *H04W 52/146* (2013.01); *H04W 52/365* (2013.01); *H04W 88/06* (2013.01)

(58) Field of Classification Search
CPC . H04W 28/085; H04W 52/367; H04W 72/05; H04W 72/12; H04W 92/20; H04W 52/146; H04W 52/365; H04W 88/06; H04B 7/02; H04L 5/001; H04L 5/0091
See application file for complete search history.

(56) References Cited

U.S. PATENT DOCUMENTS

| | | | | |
|---|---|---|---|---|
| 2012/0282970 | A1* | 11/2012 | Kela | H04W 52/248 455/522 |
| 2012/0314603 | A1 | 12/2012 | Wen et al. | |
| 2013/0088979 | A1 | 4/2013 | Bi et al. | |
| 2013/0143574 | A1 | 6/2013 | Teyeb et al. | |
| 2013/0176953 | A1 | 7/2013 | Stern-Berkowitz et al. | |
| 2013/0301568 | A1 | 11/2013 | Park et al. | |
| 2014/0106769 | A1* | 4/2014 | Bai | H04L 5/0032 455/452.1 |
| 2014/0192740 | A1 | 7/2014 | Ekpenyong et al. | |
| 2014/0329551 | A1 | 11/2014 | Ryoo et al. | |
| 2014/0349701 | A1* | 11/2014 | Vajapeyam | H04W 52/34 455/522 |
| 2015/0282246 | A1 | 10/2015 | Teyeb et al. | |
| 2015/0333991 | A1 | 11/2015 | Liu et al. | |
| 2016/0150586 | A1 | 5/2016 | Lei et al. | |
| 2017/0164298 | A1 | 6/2017 | Ryoo et al. | |
| 2019/0028976 | A1 | 1/2019 | Ryoo et al. | |

FOREIGN PATENT DOCUMENTS

| | | |
|---|---|---|
| JP | 2013-520096 A | 5/2013 |
| WO | WO 2013/113390 A1 | 8/2013 |
| WO | WO 2014/178690 | 11/2014 |

OTHER PUBLICATIONS

Notification of Reasons for Refusal dated Jan. 8, 2019, issued by the Japanese Patent Office in counterpart Japanese Patent Application No. 2018-094420.
International Search Report, Corresponding to PCT/JP2014/002423, dated Jul. 22, 2014, 1 page.
3GPP TSG RAN WG2 #83 bis Tdoc R2-133236, "MAC Aspects of Dual Connectivity," Ljubljana, Slovenia, Oct. 7-11, 2013, pp. 1-5, 5 pages.
3GPP TSG-RAN WG2 Meeting #83bis, R2-133334, Ljubljana, Slovenia, Oct. 7-11, 2013, "U-plan Architecture Alternatives for RRC Message Transmission," pp. 1-6, 6 pages.
3GPP TR 36.842 V0.2.0 (May 2013) "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects," (Release 12), May 2013, 38 pp.
3GPP TS 36.300 V11.5.0 (Mar. 2013), Technical Specification,"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 12" (Release 11), Mar. 2013, 209 pp.
3GPP TS 36.331, V11.4.0 (Jun. 2013), Technical Specification, "3rd Generation Partnership Project; Technical Specification Group Radio Access Network; Evolved Universal Terrestrial Radio Access (E-UTRA); Radio Resource Control (RRC); Protocol specification," (Rele3ase 11), Jun. 2013, 346 pp.
Extended European Search Report issued in corresponding European Patent Application No. 14857045.0, dated Jun. 9, 2017, 9 pages.
Alcatel-Lucent, Alcatel-Lucent Shanghai Bell "MAC Modifications Requires for Dual Connectivity Support", 3GPP TSG RAN WG2 Meeting #83bis, R2-133523, Ljubljana, Slovenia Oct. 7-11, 2013, XP050719235, pp. 1-3 (3 pages).
CATT "Signaling Impact Over S1/Xn", 3GPP TSG RAN WG3 #81 bis, R3-131711, Venice, Italy Oct. 7-11, 2013, XP050719985, pp. 1-6 (6 pages).
CATT, Fujitsu "Discussion on Xn Interface Functions", 3GPP TSG RAN WG3 #81 bis, R3-131710, Venice, Italy, Oct. 7-11, 2013, XP050719984, pp. 1-3 (3 pages).
LG Electronics Inc. "Throughout Enhancement by Bearer Splitting for Dual Connectivity", 3GPP TSG-RAN2 Meeting #83bis, R2-133537, Oct. 7-11, 2013, Ljubljana, Slovenia, XP050719249, pp. 1-3 (3 pages).
Alcatel-Lucent, Alcatel-Lucent Shanghai Bell "MAC Modifications Required for Dual Connectivity Support", 3GPP TSG RAN WG2 Meeting #83bis, R2-133523, Ljubljana, Slovenia Oct. 7-11, 2013, XP050719235, pp. 1-3 (3 pages).
European Office Action issued by the European Patent Office for the European Application No. 14857045.0 dated Jun. 6, 2018 (6 pages).
European Search Report in EP Application No. 18201494.4, dated Oct. 28, 2018.
Pantech: "UL transmission on dual connectivity", 3GPP Draft; R2-131802, May 11, 2013.
Alcatel-Lucent Alcatel-Lucent Shanghai Bell: MAC and PHY modifications required for dual connectivity support, 3GPP Draft; R2-131964, May 11, 2013.
ETRI: "Physical layers aspects of dual connectivity", 3GPP Draft; R1-133182, Aug. 10, 2013.
European Office Actin issued by the European Patent Office for the European Application No. 14 857 045.0, dated Jun. 8, 2018, (6 pages).
Notice of Reasons for Refusal dated Jan. 14,2020, issued by the Japanese Patent Office in counterpart Japanese Patent Application No. 2019-073908.
European Office Action dated Jun. 7, 2019, issued by the European Patent Office (EPO) in counterpart Eutopeari Patent Application No. 18 201 494.4.
R2-133259, "Scheduling Information Handling in Inter-ENB Carrier Aggregation", 3GPP RAN WG2 Meeting #83bis, Oct. 7-11, 2013, Ljubljana, Slovenia.
Extended European Search Report, dated Apr. 20, 2020, issued in counterpart European Patent Application No. 20163194.2.
U.S. Office Action dated Sep. 4, 2020, issued in co-pending U.S. Appl. No. 16/902,683.

* cited by examiner

LogicalChannelConfig information element

```
-- ASN1START
LogicalChannelConfig ::= SEQUENCE {
  ul-SpecificParameters   SEQUENCE {
    priority              INTEGER (1..16),
    prioritisedBitRate    ENUMERATED {
        kBps0, kBps8, kBps16, kBps32, kBps64, kBps128, kBps256, infinity, kBps512-v1020,
        kBps1024-v1020, kBps2048-v1020, spare5, spare4, spare3, spare2, spare1},
    bucketSizeDuration    ENUMERATED {
        ms50, ms100, ms150, ms300, ms500, ms1000,       spare2, spare1},
    logicalChannelGroup   INTEGER (0..3)
  }           OPTIONAL,
  ...,
  [[ logicalChannelSR-Mask-r9      ENUMERATED {setup} OPTIONAL     -- Cond SRmask
  ]]
}
-- ASN1STOP
```

Fig. 4

PRIOR ART

UplinkPowerControl information elements

--ASN1START

```
UplinkPowerControlCommon ::= SEQUENCE {
    p0-NominalPUSCH      INTEGER (-126..24),
    alpha                ENUMERATED {al0, al04, al05, al06, al07, al08, al09, al1},
    p0-NominalPUCCH      INTEGER (-127..-96),
    deltaFList-PUCCH     DeltaFList-PUCCH,
    deltaPreambleMsg3    INTEGER (-1..6)
}

UplinkPowerControlCommon-v1020 ::= SEQUENCE {
    deltaF-PUCCH-Format3-r10        ENUMERATED {deltaF-1, deltaF0, deltaF1,
deltaF2, deltaF3, deltaF4, deltaF5, deltaF6},
    deltaF-PUCCH-Format1bCS-r10     ENUMERATED {deltaF1, deltaF2, spare2, spare1}
}

UplinkPowerControlCommonSCell-r10 ::= SEQUENCE {
    p0-NominalPUSCH-r10  INTEGER (-126..24),
    alpha-r10            ENUMERATED {al0, al04, al05, al06, al07, al08, al09, al1}
}

UplinkPowerControlCommonSCell-v1130 ::= SEQUENCE {
    deltaPreambleMsg3-r11 INTEGER (-1..6)
}

UplinkPowerControlDedicated ::= SEQUENCE {
    p0-UE-PUSCH                     INTEGER (-8..7),
    deltaMCS-Enabled     ENUMERATED {en0, en1},
    accumulationEnabled  BOOLEAN,
    p0-UE-PUCCH                     INTEGER (-8..7),
    pSRS-Offset                     INTEGER (0..15),
    filterCoefficient               FilterCoefficient       DEFAULT fc4
}
```

Fig. 5A

PRIOR ART

```
UplinkPowerControlDedicated-v1020 ::= SEQUENCE {
    deltaTxD-OffsetListPUCCH-r10     DeltaTxD-OffsetListPUCCH-r10
    pSRS-OffsetAp-r10      INTEGER (0..15)
}

UplinkPowerControlDedicated-v1130 ::=  SEQUENCE {
    pSRS-Offset-v1130      INTEGER (16..31)
    pSRS-OffsetAp-v1130   INTEGER (16..31)
    deltaTxD-OffsetListPUCCH-v1130    DeltaTxD-OffsetListPUCCH-v1130
}

UplinkPowerControlDedicatedSCell-r10 ::=  SEQUENCE {
    p0-UE-PUSCH-r10       INTEGER (-8..7),
    deltaMCS-Enabled-r10 ENUMERATED {en0, en1},
    accumulationEnabled-r10            BOOLEAN,
    pSRS-Offset-r10                     INTEGER (0..15),
    pSRS-OffsetAp-r10      INTEGER (0..15)
    filterCoefficient-r10     FilterCoefficient          DEFAULT fc4,
    pathlossReferenceLinking-r10        ENUMERATED {pCell, sCell}
}

DeltaFList-PUCCH ::= SEQUENCE {
    deltaF-PUCCH-Format1          ENUMERATED {deltaF-2, deltaF0, deltaF2},
    deltaF-PUCCH-Format1b         ENUMERATED {deltaF1, deltaF3, deltaF5},
    deltaF-PUCCH-Format2          ENUMERATED {deltaF-2, deltaF0, deltaF1, deltaF2},
    deltaF-PUCCH-Format2a         ENUMERATED {deltaF-2, deltaF0, deltaF2},
    deltaF-PUCCH-Format2b         ENUMERATED {deltaF-2, deltaF0, deltaF2}
}

DeltaTxD-OffsetListPUCCH-r10 ::= SEQUENCE {
    deltaTxD-OffsetPUCCH-Format1-r10        ENUMERATED {dB0, dB-2},
    deltaTxD-OffsetPUCCH-Format1a1b-r10     ENUMERATED {dB0, dB-2},
    deltaTxD-OffsetPUCCH-Format22a2b-r10    ENUMERATED {dB0, dB-2},
    deltaTxD-OffsetPUCCH-Format3-r10        ENUMERATED {dB0, dB-2},
    ...
}

DeltaTxD-OffsetListPUCCH-v1130 ::=  SEQUENCE {
    deltaTxD-OffsetPUCCH-Format1bCS-r11     ENUMERATED {dB0, dB-1}
}
--ASN1STOP
```

Fig. 5B
PRIOR ART

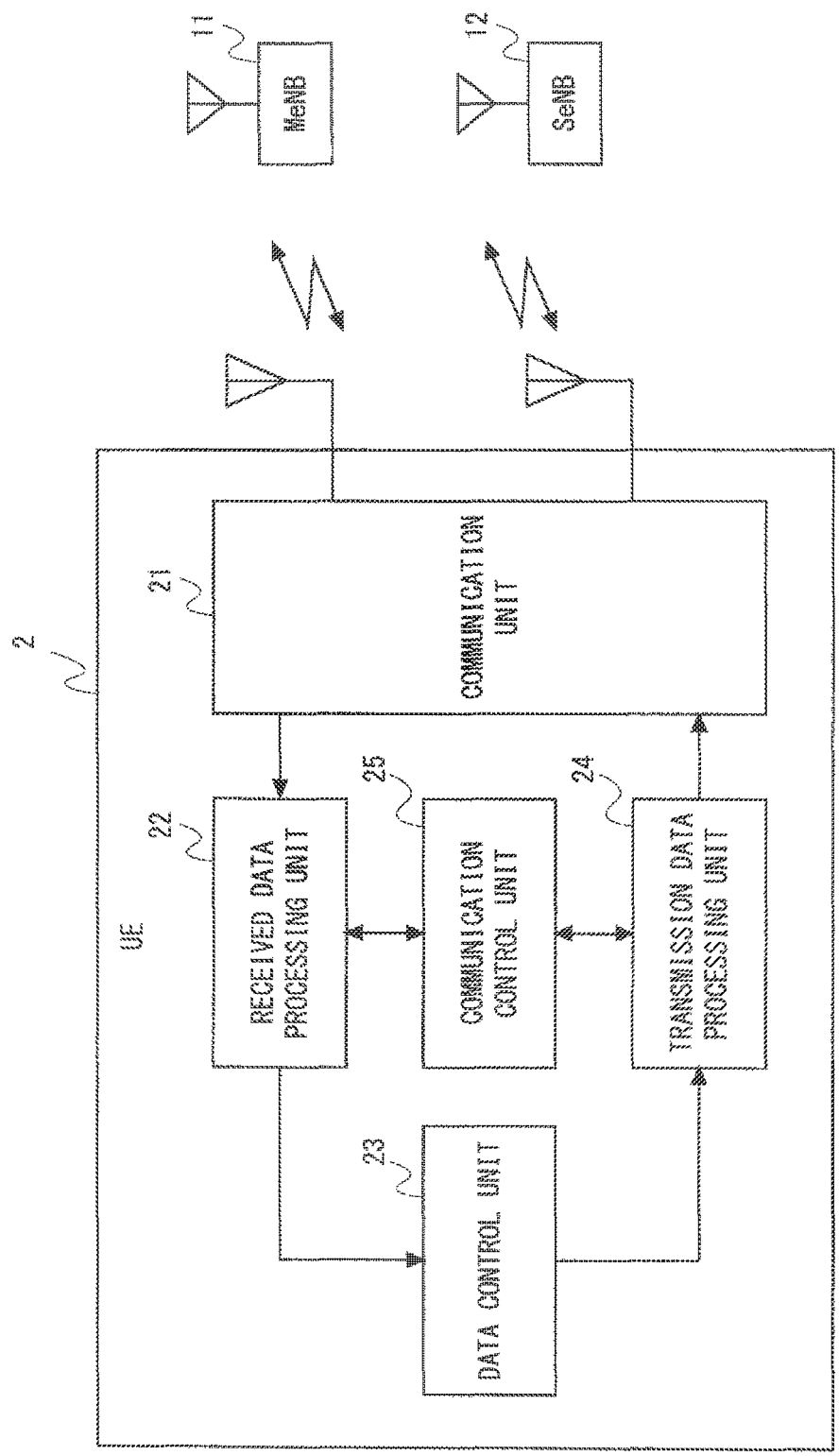

RADIO COMMUNICATION SYSTEM, BASE STATION APPARATUS, RADIO TERMINAL, AND COMMUNICATION CONTROL METHOD

CROSS-REFERENCE TO RELATED APPLICATIONS

The present application is a continuation application of U.S. patent application Ser. No. 15/028,915 entitled "Radio Communication System, Base Station Apparatus, Radio Terminal, and Communication Control Method", filed Apr. 12, 2016, which is a national stage application of International Application No. PCT/JP2014/002423 entitled "Radio Communication System, Base Station Apparatus, Radio Terminal, and Communication Control Method", filed on May 7, 2014, which claims the benefit of priority from Japanese Patent Application No. JP2013-227473, filed on Oct. 31, 2013, the disclosures of which are incorporated herein in their entirety by reference thereto.

TECHNICAL FIELD

This application relates to a radio communication system in which base stations communicate with the same radio terminal in their respective cells.

BACKGROUND ART

To improve deterioration in communication quality due to the recent rapid increase in mobile traffic and to achieve higher-speed communication, 3GPP Long Term Evolution (LTE) specifies a carrier aggregation (CA) function to allow a radio base station (eNode B (eNB)) and a radio terminal (User Equipment (UE)) to communicate with each other using a plurality of cells. The cells which can be used by the UE in the CA are limited to cells of one eNB (i.e., cells that are served or managed by the eNB). The cells used by the UE in the CA are classified into a primary cell (PCell) that is already used as a serving cell when the CA is started and a secondary cell(s) (SCell(s)) that is used additionally or subordinately. In the PCell, Non Access Stratum (NAS) mobility information (NAS mobility information) and security information (security input) is sent and received during radio connection (re)-establishment (RRC Connection Establishment, RRC Connection Re-establishment) (see Section 7.5 in Non-Patent Literature 1).

In the CA, SCell configuration information transmitted from the eNB to the UE includes SCell radio resource configuration information common to UEs (RadioResourceConfigCommonSCell) and SCell radio resource configuration information dedicated to a specific UE (RadioResourceConfigDedicatedSCell). The latter information mainly indicates a dedicated configuration (PhysicalConfigDedicated) for a physical layer. When cells (carriers) having different transmission timings (Timing Advance: TA) are aggregated in an uplink, configuration information (MAC-MainConfigSCell) about a Medium Access Control (MAC) sublayer is also transmitted from the eNB to the UE. However, the configuration information about the MAC sublayer includes only an STAG-Id, which is an index of TA Group (TAG) representing a set of cells included in the same TA (see Section 5.3.10.4 in Non-Patent Literature 2). The other configurations for the MAC sublayer in the SCell are the same as those in the PCell.

One of the ongoing study items in the LTE standardization related mainly to a Heterogeneous Network (HetNet) environment is dual connectivity in which the UE performs communication using a plurality of cells of a plurality of eNBs (see Non Patent-Literature 3). Dual connectivity is a process to allow an UE to perform communication simultaneously using both radio resources (i.e., cells or carriers) provided (or managed) by a main base station (master base station, Master eNB (MeNB)) and a sub base station (secondary base station, Secondary eNB (SeNB)). Dual connectivity enables inter-eNB CA in which the UE aggregates a plurality of cells managed by different eNBs. Since the UE aggregates radio resources managed by different nodes, dual connectivity is also called "inter-node radio resource aggregation". The MeNB is connected to the SeNB through an inter-base-station interface called Xn. The MeNB maintains, for the UE in dual connectivity, the connection (S1-MME) to a mobility management apparatus (Mobility Management Entity (MME)) in a core network (Evolved Packet Core (EPC)). Accordingly, the MeNB can be called a mobility management point (or mobility anchor) of the UE. For example, the MeNB is a Macro eNB, and the SeNB is a Pico eNB or Low Power Node (LPN).

Further, in dual connectivity, a bearer split for splitting a network bearer (EPS bearer) over the MeNB and the SeNB has been studied. The term "network bearer (EPS Bearer)" used in this specification means a virtual connection that is configured between a UE and an endpoint (i.e., Packet Data Network Gateway (P-GW)) in a core network (EPC) for each service provided to the UE. In an alternative of the bearer split, for example, both a radio bearer (RB) in a cell of the MeNB and a radio bearer in a cell of the SeNB are mapped to one network bearer. The radio bearer (RB) described herein refers mainly to a data radio bearer (DRB). The bearer split will contribute to a further improvement in user throughput.

CITATION LIST

Non Patent Literature

[Non-Patent Literature 1] 3GPP TS 36.300 V11.5.0 (2013-03), "3rd Generation Partnership Project; Technical Specification Group Radio Access Network; Evolved Universal Terrestrial Radio Access (E-UTRA) and Evolved Universal Terrestrial Radio Access Network (E-UTRAN), Overall description; Stage 2 (Release 11)", March, 2013
[Non-Patent Literature 2] 3GPP TS 36.331 V11.4.0 (2013-06), "3rd Generation Partnership Project; Technical Specification Group Radio Access Network; Evolved Universal Terrestrial Radio Access (E-UTRA); Radio Resource Control (RRC); Protocol specification (Release 11)", June, 2013
[Non-Patent Literature 3] 3GPP TR 36.842 V0.2.0 (2013-05), "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", May, 2013

SUMMARY OF INVENTION

Technical Problem

In the LIE, an UE generates an uplink (UL) Medium Access Control Protocol Data Unit (MAC PDU) to be transmitted using available resources (Uplink Grant) allocated from an eNB, One MAC PDU is also called a transport block. In the generation of an UL MAC PDU, logical channels configured in the UE are multiplexed on one MAC PDU. At this time, it is necessary to guarantee the QoS of each EPS bearer configured in the uplink. Accordingly, the UE generates an UL MAC PDU in accordance with a Logical Channel Prioritization (LCP) procedure. In the Logical Channel Prioritization (LCP) procedure, a priority and a Prioritized Bit Rate (PBR) are given to each logical channel. The PBR is a bit rate which is provided to one logical channel before allocating any resource to a logical channel having a lower priority. The PBR is configured by the eNB for each logical channel. In the LCP procedure, first, all logical channels are guaranteed to be allocated resources corresponding to respective PBRs in descending order of their priorities. Next, if there are still any available resources left after all logical channels have been served up to their PBR, the remaining resources are allocated to the logical channels in a descending order of priorities of the logical channels until there is no data of logical channels, or until the allocated resources are used up.

However, in dual connectivity involving a bearer split, it is considered that the MeNB and the SeNB each independently perform Radio Resource Management (RRM). Accordingly, there is a possibility that the MeNB and the SeNB each independently perform the above-mentioned LCP procedure, which may lead to an unfairness between resources (i.e., effective bit rate) allocated to a logical channel (or EPS bearer, radio bearer) which is not subjected to a bearer split and is transmitted only in the PCell and resources allocated to a logical channel (or EPS bearer, radio bearer) which is subjected to a bearer split and is transmitted in the PCell and the SCell. In other words, the balance of resource allocation between a logical channel which is not subjected to a bearer split and a logical channel which is subjected to a bearer split may be lost, and consequently, the LCP procedure may not function as intended.

In the case of performing dual connectivity involving a bearer split, there is a possibility that expected performance cannot be obtained not only in the generation of MAC PDUs (i.e., the LCP procedure) described above, but also in other Layer 1/Layer 2 control in an access stratum. For example, in uplink transmission power control (PC), there is a possibility that the distribution of transmission power between the uplink transmission in the PCell and the uplink transmission in the SCell may not be performed as intended. Further, in the case of performing dual connectivity involving a bearer split, there is a possibility that expected performance cannot be obtained not only in the uplink Layer 1/Layer 2 control, but also in the downlink Layer 1/Layer 2 control. It is also possible that expected performance cannot be obtained in control of layer 3 of the Access stratum (i.e., Radio Resource Control (RRC)) in the uplink or the downlink or both.

Accordingly, one object to be achieved by embodiments disclosed in the specification is to contribute to an improvement in control of an access stratum when dual connectivity involving a bearer split is performed. Other objects and novel features will become apparent from the following description and the accompanying drawings.

Solution to Problem

In an embodiment, a radio communication system includes a first base station that manages a first cell, a second base station that manages a second cell, and a radio terminal. The radio terminal supports dual connectivity involving a bearer split in which a first network bearer between the radio terminal and a core network is split over the first base station and the second base station. The first base station is configured to receive, from the second base station, bearer split status information about communication of the first network bearer in the second base station, and to perform control of an access stratum related to the first network bearer.

In an embodiment, a base station apparatus includes a communication control unit configured to control dual connectivity involving a bearer split in which a first network bearer between a radio terminal and a core network is split over the base station apparatus and a neighbor base station. The communication control unit is configured to receive, from the neighbor base station, bearer split status information about communication of the first network bearer in the neighbor base station, and to perform control of an access stratum related to the first network bearer.

In an embodiment, a base station apparatus includes a communication control unit configured to control dual connectivity involving a bearer split in which a first network bearer between a radio terminal and a core network is split over the base station apparatus and a neighbor base station. The communication control unit is configured to transmit, to the neighbor base station, bearer split status information about communication of the first network bearer in the base station apparatus. The bearer split status information triggers the neighbor base station to perform control of an access stratum related to the first network bearer.

In an embodiment, a radio terminal is used in the radio communication system described above and includes a communication control unit configured to control dual connectivity involving a bearer split in which the first network bearer is split over first and second base stations. The communication control unit is configured to perform control of an access stratum related to the first network bearer based on an instruction from the first base station.

In an embodiment, a control method includes: (a) starting, by a first base station, communication of dual connectivity involving a bearer split in which a first network bearer between a radio terminal and a core network is split over the first base station and a second base station; and (b) receiving, by the first base station from the second base station, bearer split status information about communication of the first network bearer in the second base station, and performing, by the first base station, control of an access stratum related to the first network bearer.

In an embodiment, a control method includes: (a) starting, by a second base station, communication of dual connectivity involving a bearer split in which a first network bearer between a radio terminal and a core network is split over a first base station and the second base station; and (b) transmitting, to the first base station, bearer split status information about communication of the first network bearer in the second base station. The bearer split status information triggers the first base station to perform control of an access stratum related to the first network bearer.

In an embodiment, a program includes instructions (software codes) for causing a computer to perform the above-described method when the program is loaded into the computer.

ADVANTAGEOUS EFFECTS OF INVENTION

According to the embodiments described above, it is possible to contribute to an improvement in control of an access stratum when dual connectivity involving a bearer split is performed.

BRIEF DESCRIPTION OF DRAWINGS

FIG. 4 is a diagram showing a LogicalChannelConfig information element specified in 3GPP TS 36.331;

FIG. 5A is a diagram showing UplinkPowerControl information elements specified in 3GPP TS 36.331;

FIG. 5B is a diagram showing UplinkPowerControl information elements specified in 3GPP TS 36.331;

FIG. 12 is a block diagram showing a configuration example of a UE according to the first to fourth embodiments.

DESCRIPTION OF EMBODIMENTS

Specific embodiments will hereinafter be described in detail with reference to the drawings. The same or corresponding elements are denoted by the same reference symbols throughout the drawings, and repeated descriptions thereof are omitted as appropriate for clarity of the explanation.

First Embodiment

Figure 1A:
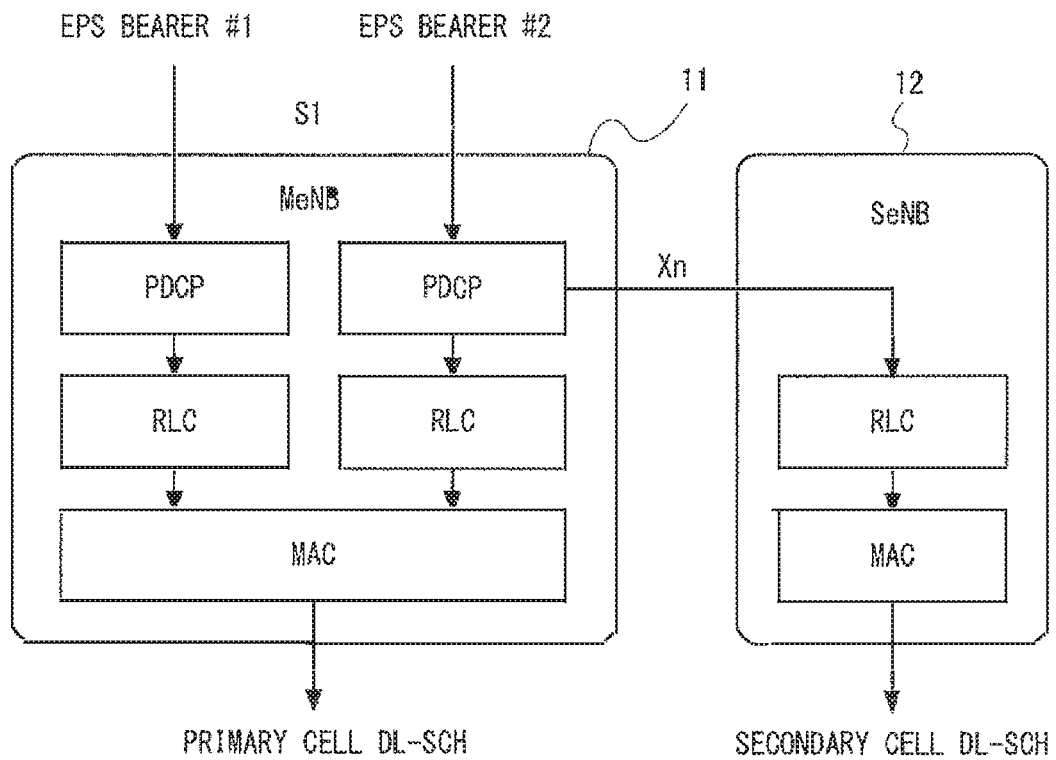
FIG. 1A is a diagram showing an example of a user plane protocol stack in a downlink direction of LTE Layer 2 related to dual connectivity involving a bearer split.
Figure 1B:
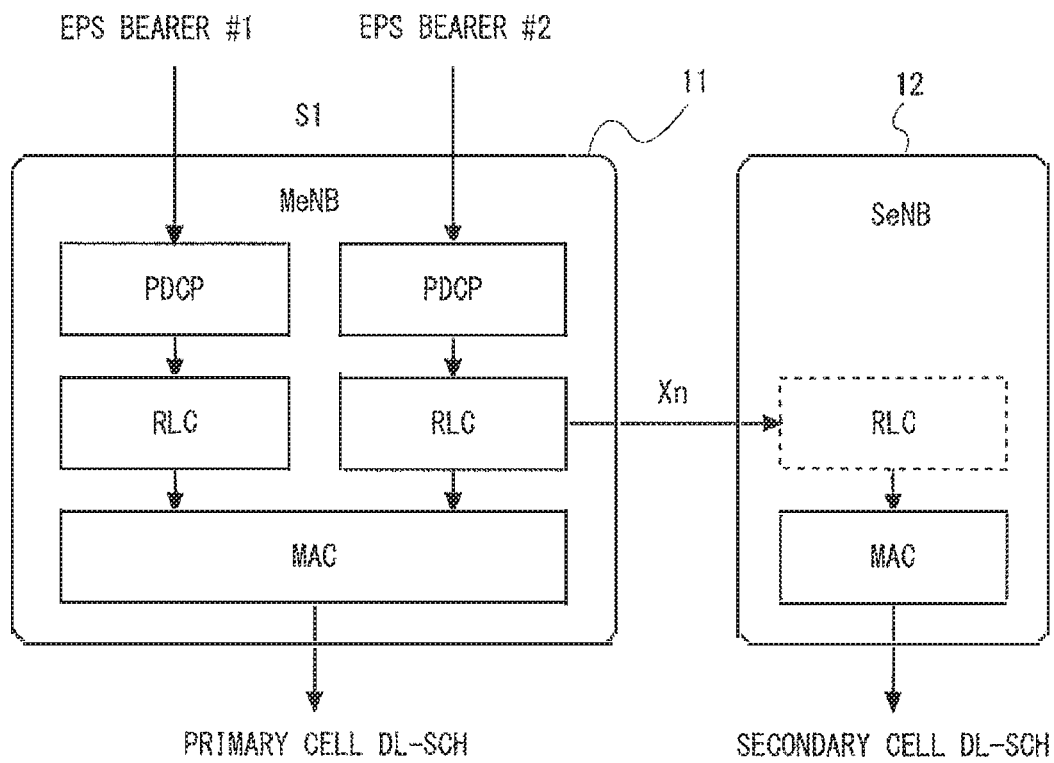
FIG. 1B is a diagram showing another example of the user plane protocol stack in the downlink direction of LTE Layer 2 related to dual connectivity involving a bearer split.

First, with regard to some embodiments including this exemplary embodiment, several examples of dual connectivity (e.g., inter-node radio resource aggregation) involving a bearer split are described. FIGS. 1A and 1B show two alternatives of a user plane protocol stack in a downlink direction of LTE Layer 2 related to dual connectivity involving a bearer split. In the bearer split, a network bearer (EPS bearer) configured between a UE and an endpoint (i.e., P-GW) of a core network (EPC) is split over an MeNB 11 and an SeNB 12. In the alternatives shown in FIGS. 1A and 1B, an EPS bearer #2 is split over the MeNB 11 and the SeNB 12. An EPS bearer #1 shown in FIGS. 1A and 1B is a normal bearer which is not subjected to a bearer split. Accordingly, the EPS bearer #1 is mapped in a one-to-one correspondence to the radio bearer in a cell of the MeNB 11.

In the alternatives shown in FIGS. 1A and 1B, one data radio bearer (DRB), which has a one-to-one association with the EPS bearer #,2 is split over the MeNB 11 and the SeNB 12 in a Packet Data Convergence Protocol (PDCP) sublayer, a Radio Link Control (RLC) sublayer, or a MAC sublayer of Layer-2. Specifically, in the alternative shown in FIG. 1A, a PDCP entity of the MeNB 11 terminates the S1-U of the EPS bearer #2. In other words, one S1 bearer and one data radio bearer (DRB) which are mapped to the EPS bearer #2 are terminated at the PDCP sublayer of the MeNB 11. Further, in the alternative shown in FIG. 1A, the MeNB 11 and the SeNB 12 have independent RLC entities for bearer split, and one DRB (or PDCP bearer) terminated at the MeNB 11 is split into the RLC bearer of the MeNB 11 and the RLC bearer of the SeNB 12. Note that, the term "PDCP bearer" means a connection terminated at the PDCP sublayers of the eNB and the UE. The PDCP bearer can also be called a PDCP Protocol Data Unit (PDCP PDU). In the example shown in FIG. 1A, there is one PDCP bearer related to the EPS bearer #2 to be split, and this PDCP bearer is terminated at the MeNB 11 and the UE 2. On the other hand, the term "RLC bearer" means a connection terminated at the RLC sublayers of the eNB and the UE. The RLC bearer can also be called an RLC PDU or a logical channel. In the example shown in FIG. 1, there are two independent RLC bearers associated with the EPS bearer #2. One of the two RLC bearers is terminated at the MeNB 11 and the UE 2, and the other one is terminated at the SeNB 12 and the UE 2. Accordingly, in the architecture shown in FIG. 1A, the UE 2 is required to have two independent RLC entities associated with the EPS bearer #2 to be split.

Like in the alternative shown in FIG. 1A, in the alternative shown in FIG. 1B, a PDCP entity of the MeNB 11 terminates the S1-U of the EPS bearer #2. Further, as for the EPS bearer #2 to be split, the MeNB 11 has a master RLC entity and the SeNB 12 has a slave RLC entity. In the alternative shown in FIG. 1B, the UE 2 is required to have only one RLC entity associated with the EPS bearer #2 to be split. In the downlink, the slave RLC entity of the SeNB 12 receives, from the master RLC entity of the MeNB 11, RLC PDUs that has already been generated by the master RLC entity and allocated to the slave RLC for transmission.

The following description is based on an assumption that a cell of the MeNB 11 can be called a PCell and a cell of the SeNB 12 can be called an SCell from the viewpoint of the conventional Carrier Aggregation (CA). However, the scope of this embodiment is not limited to this. For example, when the radio terminal (UE) performs the CA (Intra-SeNB CA) on a plurality of cells of the SeNB 12 (i.e., at least a plurality of downlink Component Carriers (CCs)) during dual connectivity, one of the cells of the SeNB 12 subjected to the CA may be defined as a PCell or a pseudo PCell which functions similarly to a PCell. The pseudo PCell can also be called an Anchor cell, a Master cell, a Control cell, or the like. In the CA of the cells of the SeNB 12, the former cell (the PCell of the SeNB 12) has a role similar to that of the PCell in the conventional CA. In the PCell of the SeNB 12, for example, the eNB (SeNB) carries out SCell configuration or SCell activation/deactivation for the CA, and the UE carries out Radio Link Monitoring (RLM)/Radio Link Failure (RLF) detection. Further, the UE may perform, for example, transmission of L1/L2 control information (e.g., CQI, CSI, HARQ feedback, Scheduling Request) in an uplink control channel (PUCCH), transmission of (a preamble of) a Contention-based Random Access Channel (RACH), and reception of a response (Random Access Response (RAR)) to the RACH Preamble. The latter cell (the Pseudo PCell of the SeNB 12) has a role as a cell having a PCell function regarding the control of a User Plane (UP) in the conventional CA. In the Pseudo PCell of the SeNB 12, the UE may perform, for example, transmission of L1/L2 control information in the uplink control channel (PUCCH), transmission of (a preamble of) a Contention-based RACH, and reception of a response (RAR) to the RACH Preamble. Furthermore, in the UE, the cells of the MeNB 11 and the cells of the SeNB 12 need not necessarily have a hierarchical relationship (PCell and SCell) or a master-slave relationship.

The user plane protocol stack for dual connectivity involving a bearer split is not limited to the alternatives shown in FIGS. 1A and 1B. In the bearer split, for example, two radio bearers may be mapped to one network bearer (EPS bearer). When the terms in FIGS. 1A and 1B are used, it can be expressed that the EPS bearer #2 is mapped to both the radio bearer (RB) in the cell (PCell) of the MeNB 11 and the radio bearer in the cell (SCell) of the SeNB 12. For convenience of explanation, the radio bearer in the cell (PCell) of the MeNB 11 is defined herein as a Primary RB (P-RB) and the radio bearer (RB) in the cell (SCell) of the SeNB is defined herein as a Secondary RB (S-RB). Since the bearer split is mainly applied to data radio bearers (DRBs), the P-RB and the S-RB can also be called P-DRB and S-DRB, respectively. For example, the MeNB 11 may terminate the S1-U of the EPS bearer #2, and the MeNB 11 and the SeNB 12 may have independent PDCP entities. Further, in a new layer higher than the PDCP entity of the MeNB 11, a downlink S1-U packet stream of the EPS bearer #2 may be split over the PDCP entity of the MeNB 11 and the PDCP entity of the SeNB 12. In this case, there are two independent PDCP bearers related to the EPS bearer #2, One of the two PDCP bearers is terminated at the MeNB 11 and the UE 2, and the other one is terminated at the SeNB 12 and the UE 2.

Figure 2A:
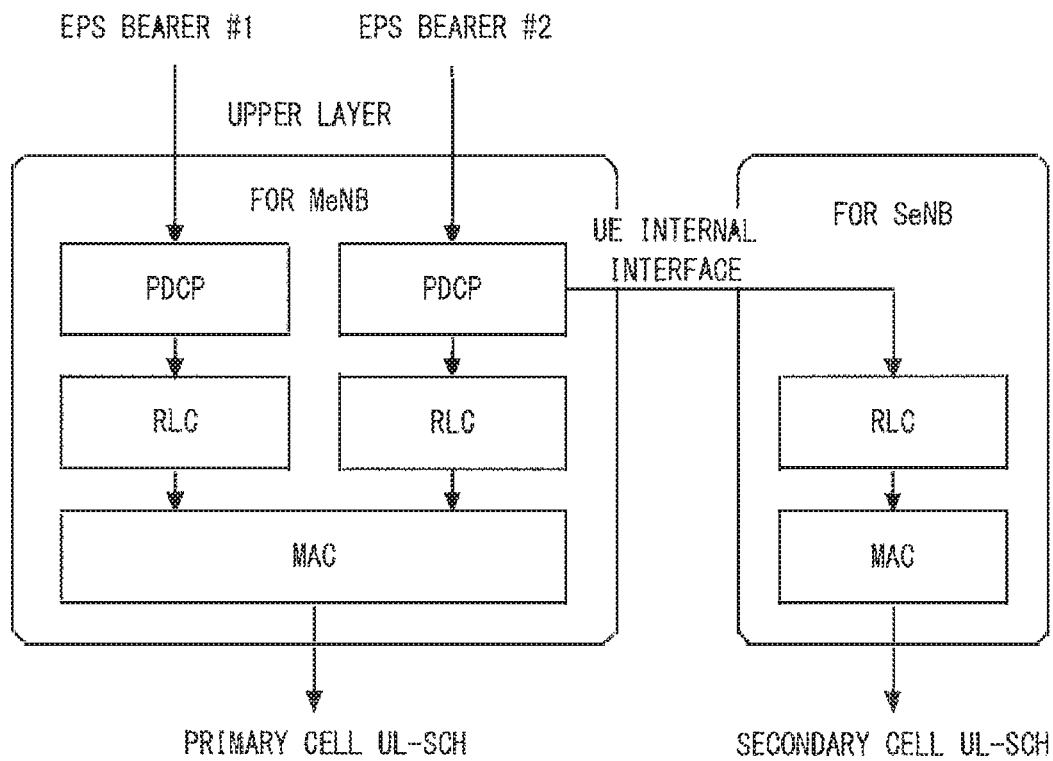
FIG. 2A is a diagram showing an example of a user plane protocol stack in an uplink direction of LTE Layer 2 related to dual connectivity involving a bearer split.
Figure 2B:
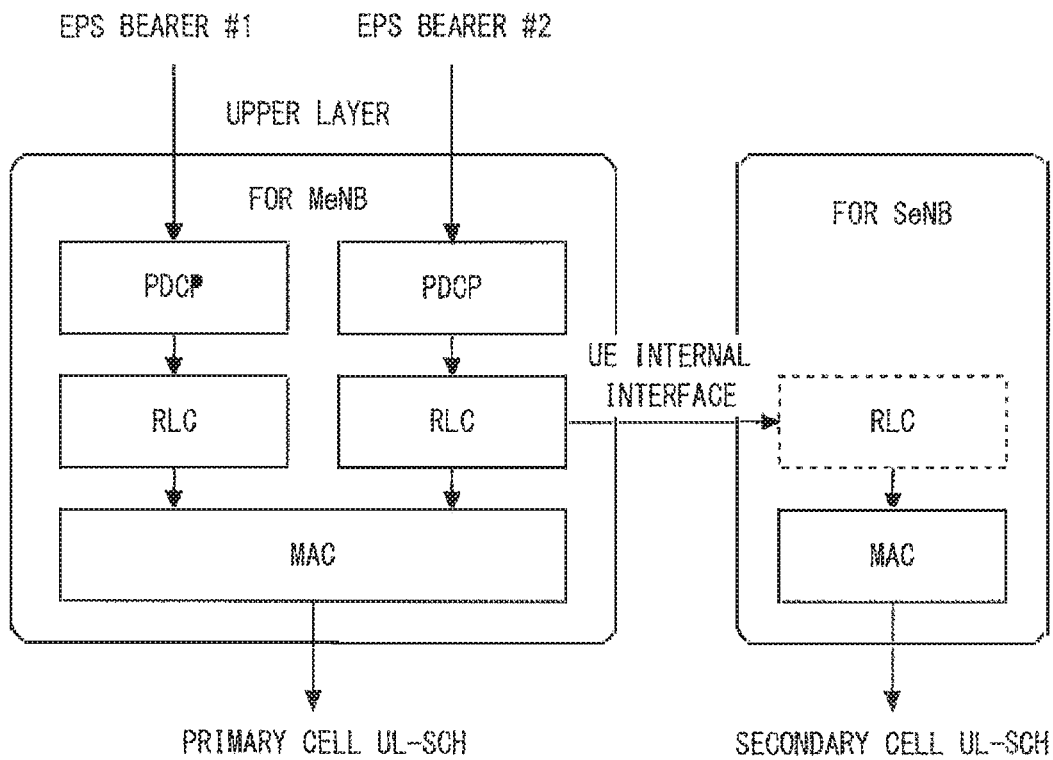
FIG. 2B is a diagram showing another example of the user plane protocol stack in the uplink direction of LIE Layer 2 related to dual connectivity involving a bearer split.

The user plane protocol stack in the uplink direction of LTE Layer 2 related to dual connectivity involving a bearer split is similar to that in the downlink direction described above. FIGS. 2A and 2B show two alternatives of the user plane protocol stack in the uplink direction of the UE 2, and correspond to FIG. 1A and FIG. 1B, respectively. In the alternative shown in FIG. 2A, one PDCP entity of the UE 2 receives user data of the EPS bearer #2 from an upper layer. The PDCP entity of the UE 2 distributes PDCP PDUs between a MAC entity to transmit to the MeNB 11 and a MAC entity to transmit to the SeNB 12, and sends the MAC entities. In other words, the PDCP PDUs (i.e., PDCP bearer) are split over an RLC bearer to be transmitted to the MeNB 11 and an RLC bearer to be transmitted to the SeNB 12. Like in the alternative shown in FIG. 1B, in the alternative shown in FIG. 2B, the UE 2 has a master RLC entity (RLC entity for the MeNB 11 shown in the left side of FIG. 2B) and a slave RLC entity (RLC entity for the SeNB 12 shown in the right side of FIG. 2B). The slave RLC entity of the UE 2 receives, from the master RLC entity, the RLC PDUs which are already generated by the master RLC entity and allocated to the slave RLC for transmission. The alternatives shown in FIGS. 2A and 2B are only illustrative and other architectures can also be employed. For example, in the alternatives shown in FIG. 2A and FIG. 2B, the UE 2 has the MAC entity for the MeNB 11 and the MAC entity for the SeNB 12. However, the UE 2 may have only one MAC entity for uplink transmission.

Figure 3:
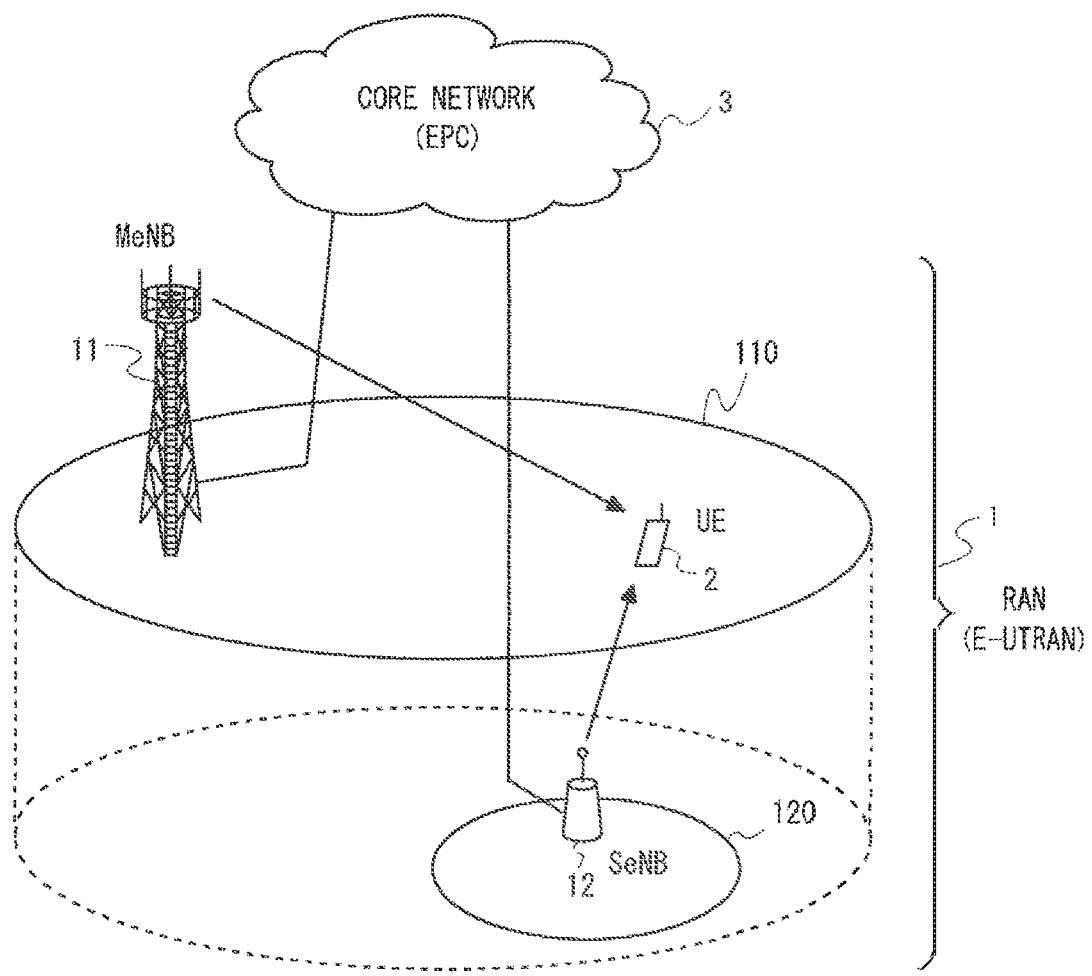
FIG. 3 is a diagram showing a configuration example of a radio communication system according to first to fourth embodiments.

FIG. 3 shows a configuration example of a radio communication system according to some embodiments including this embodiment. The radio communication system includes a radio access network (RAN) 1, a radio terminal (UE) 2, and a core network 3. In the EPS, the RAN 1 is an Evolved UMTS Terrestrial Radio Access Network (E-UTRAN), and the core network 3 is an Evolved Packet Core (EPC). The E-UTRAN 1 includes base stations (evolved NodeBs (eNBs)) 11 and 12. The eNB 11 manages a cell 110, and the eNB 12 manages a cell 120. The UE 2 is connected to the eNBs 11 and 12 by means of a radio access technology. The EPC 3 is accessed from the UE 2 through the E-UTRAN 1, and provides the UE 2 with a connection service (e.g., Internet Protocol (IP) connection service) for connecting to an external network (Packet Data Network (PDN)). In addition, FIG. 3 shows a HetNet environment. Specifically, the cell 110 shown in FIG. 3 has a coverage area larger than that of the cell 120. FIG. 3 also shows a hierarchical cell configuration in which the cell 120 is located within the cell 110. However, the cell configuration shown in FIG. 3 is merely an example. For example, the cells 110 and 120 may have the same degree of coverage. In other words, the radio communication system according to this embodiment may be applied to a homogeneous network environment.

The E-UTRAN 1 and the UE 2 according to this embodiment support dual connectivity involving a bearer split. Specifically, while using the cell 110 of the eNB (i.e., MeNB) 11 as a primary cell (PCell), the UE 2 can use the cell 120 of the eNB (i.e., SeNB) 12 as a secondary cell (SCell). The UE 2 can receive and/or transmit data of one EPS bearer subjected to a bearer split through the PCell 110 and the SCell 120.

In order to improve the Layer 1/Layer 2 control of an access stratum in the case of performing dual connectivity involving a bearer split, the MeNB 11 and the SeNB 12 according to this embodiment carry out a control procedure or signaling as described below. The SeNB 12 is configured to transmit, to the MeNB 11, bearer split status information about communication in the SeNB 12 (i.e., SCell 120) of the EPS bearer to be subjected to a bearer split (hereinafter referred to as a split EPS bearer). The MeNB 11 is configured to perform control of the access stratum related to the split EPS bearer in response to receiving the bearer split status information from the SeNB 12.

The bearer split status information may include, for example, at least one of communication status information, radio resource control information, and admission control information.

The communication status information indicates a communication status of the split EPS bearer in the SeNB 12 (i.e., SCell 120). The communication status of the split EPS bearer in the SeNB 12, which is indicated by the communication status information and sent to the MeNB 11 from the SeNB 12, may be a communication status in Layer 1 or Layer 2 of the SCell 120. More specifically, the communication status of the split EPS bearer in the SeNB 12 may include at least one of the following items (1) to (6):
(1) Statistics of throughput;
(2) Statistics of allocated radio resources;
(3) Statistics of packet losses;
(4) Statistics of power headroom;
(5) Information about retransmission control in the Radio Link Control (RLC) sublayer; and (6) Information about packet discarding in the Radio Link Control (RLC) sublayer.

The statistics of throughput may be, for example, at least one of an average value, a minimum value, and a maximum value of a data rate (e.g., transmission rate or data rate of PDCP SDU, PDCP PDU, RLC PDU, or MAC PDU (i.e., Transport Block)) of the UE 2 in the SeNB 12. The statistics of allocated radio resources may be, for example, at least one of an average value, a minimum value, and a maximum value of radio resources allocated to the UE 2 in the SeNB 12. In this case, the radio resources may be, for example, resource blocks. When the SeNB 12 transmits data of the split EPS bearer to the UE 2 by using a plurality of cells, the statistics of throughput and the statistics of radio resources may be a value in each of the plurality of cells, or the total value of the plurality of cells.

The statistics of packet losses may be, for example, the number or ratio of discarded packets in a radio interface (LTE-Uu interface) between the SeNB 12 and the UE 2, or in an inter-base-station interface (Xn interface) between the MeNB 11 and the SeNB 12. In this case, the packets may be, for example, PDCP SDUs, PDCP PDUs, RLC PDUs, or MAC PDUs (i.e., Transport Blocks). The statistics of packet losses may be statistics observed not for the Xn interface, but for an X2 interface or an S1 interface.

The statistics of uplink power headroom indicate, for example, an average value of power headroom of the UE 2 for the SCell 120 (in a predetermined period). The power headroom indicates a difference (i.e., surplus transmission power) between the uplink maximum transmission power of the UE 2 and the transmission power of a Physical Uplink Shared channel (PUSCH) in the present subframe. The UE 2 reports the power headroom for the SCell 120 to the SeNB 12. The UE 2 may report the power headroom for the PCell 110 and the power headroom for the SCell 120 to the SeNB 12.

The information about retransmission control in the RLC sublayer may indicate a NACK ratio of Automatic Repeat Request (ARQ) for RLC PDUs (i.e., logical channel) of the split EPS bearer (i.e., a ratio of NACKs with respect to the total of ACKs and NACKs), the number of retransmissions in the ARQ, or a frequency of occurrence of retransmission in the ARQ.

The information about packet discarding in the RLC sublayer may indicate the rate or number of discarded RLC SDUs of the split EPS bearer, or the data amount of discarded RLC SDUs. Packet discarding in the RLC sublayer (i.e., discarding of RLC SDUs) may be executed in response to an instruction from the PDCP sublayer of the MeNB 11. Alternatively, the RLC sublayer of the SeNB 12 may independently determine whether to perform packet discarding.

The communication status information transmitted from the SeNB 12 to the MeNB 11 may indicate, for example, a communication status monitored for each split EPS bearer, monitored for each ratio bearer mapped to the split EPS bearer, monitored for each SCell 120, or monitored for each SeNB 12. The communication status monitored for each SCell 120 may be obtained by observation of each SCell 120 and each radio terminal (UE) which performs a bearer split, or may be obtained by observation of each SCell 120 and a plurality of radio terminals which perform a bearer split in the SeNB 12. The same is true of the communication status monitored for each SeNB 12.

Next, the control of the access stratum performed by the MeNB 11 is described. The control of the access stratum may be, for example, a Layer 1 control, a Layer 2 control, a Layer 3 control, or any combination thereof. Several examples of the Layer 1/Layer 2 control of the access stratum are given below. Note that, the Layer 1/Layer 2 control of the access stratum may be a Layer 3 (RRC) control or signaling regarding functions in Layer 1 (PHY)/Layer 2 (MAC, RLC, and PDCP). For example, the MeNB 11 may perform at least one of the following controls (a) to (c) in response to receiving from the SeNB 12 the communication status of the split EPS bearer in the SeNB 12.

(a) Control for Generation of Uplink (UL) MAC PDUs

Even during execution of the bearer split, the UE 2 should generate MAC PDUs in consideration of an EPS bearer QoS (QoS class identifier (QCI), a guaranteed bit rate (GBR), an aggregate maximum bit rate (AMBR), etc.) for each of all EPS bearers including a split EPS bearer and a non-split EPS bearer. Accordingly, if the uplink LCP procedure does not function as intended due to, for example, the excess uplink throughput of the split EPS bearer in the SCell 120, the MeNB 11 may adjust an uplink Prioritized. Bit Rate (PBR) or Bucket Size Duration (BSD) or both of them, which are applied to the split EPS bearer or the non-split EPS bearer or both of them, so that the LCP procedure functions as intended. For example, when the throughput of the split EPS bearer in the SCell 120 is excessive, the MeNB 11 may decrease the uplink PBR applied to the split EPS bearer in the PCell 110 and may increase the uplink PBR applied to the non-split EPS bearer in the PCell 110. In this case, the PBR can also be called a prioritized resource amount. For example, the RRC layer in the MeNB 11 may determine the PBR applied to the split EPS bearer and the PBR applied to the non-split EPS bearer, and may notify the UE 2 of the determined PBR values by RRC signaling. The PBR applied to the split EPS bearer in the PCell 110 may be the same as or different from that in the SCell 120. Further, the MeNB 11 may determine the BSD for each of the split EPS bearer and the non-split EPS bearer, and may notify the UE 2 of the obtained BSD values. The BSD of the split EPS bearer in the PCell 110 may be the same as or different from that in the SCell 120. Non-Patent Literature 2 (3GPP TS 36.331) specifies parameters regarding the LCP including the PBR and the BSD (see FIG. 4). The parameters shown in FIG. 4, including the PBR and the BSD, may be adjusted in the control of the access stratum according to this embodiment. The parameters shown in FIG. 4 may be set separately for the split EPS bearer and the non-split EPS bearer. The parameters set for the split EPS bearer in the cell 110 of the MeNB 11 may be the same or different from the parameters set for the split EPS bearer in the cell 120 of the SeNB 12.

(b) Uplink (UL) Transmission Power Control

The MeNB 11 may adjust the transmission power of the UE 2 to achieve intended distribution of transmission power between uplink transmission in the PCell 110 and uplink transmission in the SCell 120. For example, in response to determining, based on the communication status information received from the SeNB 12, that the power headroom of the UE 2 in the PCell 110 is less than the power headroom of the UE 2 in the SCell 120 by more than a predetermined amount, the MeNB 11 may adjust a parameter(s) used for a formula for calculating $P_{CMAX}$ so as to increase the configured maximum transmission power $P_{CMAX, PCELL}$ in the PCell 110 of the UE 2 and to decrease the configured maximum transmission power $P_{CMAX, SCELL}$ in the SCell 120 of the UE 2. The formula for calculating $P_{CMAX}$ is specified in 3GPP TS 36.301. Specifically, the MeNB 11 may adjust the maximum transmission power (i.e., transmit power limit) $P_{EMAX, PCELL}$, which is allowed for the UE 2 in the PCell 110, or the maximum transmission power $P_{EMAX, SCELL}$, which is allowed for the UE 2 in the SCell 120, or both of them. Non-Patent Literature 2 (3GPP TS 36.331) specifies parameters regarding the UL, transmission power control (see FIGS. 5A and 5B). The parameters shown in FIGS. 5A and 5B may be adjusted in the control of the access stratum according to this embodiment. The parameters set to the cell 110 of the MeNB 11 may be the same or different from the parameters set to the cell 120 of the SeNB 12.

(c) Control for Generation of Downlink (DL) MAC PDUs

The MeNB 11 may perform control regarding the downlink similar to the above-described control for generation of uplink MAC PDUs. Specifically, in response to determining, based on the communication status information received from the SeNB 12, that the downlink LCP procedure does not function as intended, the MeNB 11 may adjust the downlink PBR for the split EPS bearer or the downlink PBR for the non-split EPS bearer or both of them, so that the LCP procedure functions as intended. For example, when the downlink throughput of the split EPS bearer in the SCell 120 is excessive, the MeNB 11 may decrease the downlink PBR applied to the split EPS bearer in the PCell 110 and may increase the downlink PBR applied to the non-split EPS bearer in the PCell 110. In this case, the PBR can also be called a prioritized resource amount.

The above description concentrates on an example in which the SeNB 12 reports to the MeNB 11 the communication status regarding the split EPS bearer in the SeNB 12 (SCell 120) and the MeNB 11 performs the Layer 1/Layer 2 control of the access stratum. However, it should be noted that the roles of the MeNB 11 and the SeNB 12 are interchangeable. Specifically, the MeNB 11 may report to the SeNB 12 the communication status related to the split EPS bearer in the MeNB 11 (PCell 110). The SeNB 12 may perform the Layer 1/Layer 2 control of the access stratum related to the split EPS bearer in response to receiving the communication status information from the MeNB 11 (PCell 110).

Figure 6:
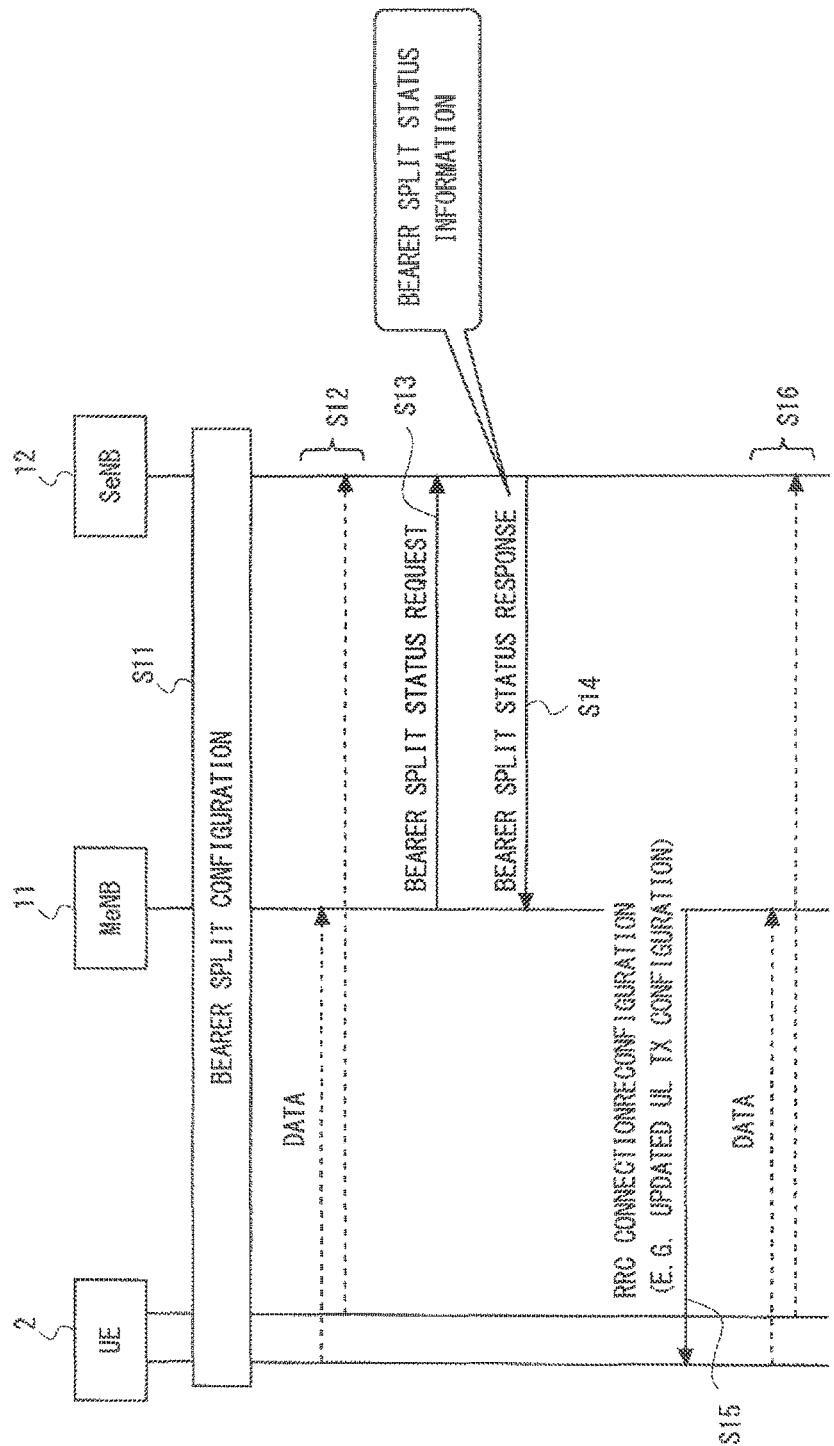
FIG. 6 is a sequence diagram showing an example of a control procedure regarding dual connectivity involving a bearer split according to the first embodiment.

Next, a specific example of the control procedure according to this embodiment is described. FIG. 6 is a sequence diagram showing an example of the control procedure regarding dual connectivity involving a bearer split. In step S11, the control procedure for starting the dual connectivity involving a bearer split is performed among the MeNB 11, the SeNB 12, and the UE 2. Accordingly, in step S12, the UE 2 performs uplink, downlink, or bidirectional communication of the split EPS bearer with the MeNB 11 and the SeNB 12.

In step S13, the MeNB 11 sends a bearer split status request to the SeNB 12. In step S14, in response to receiving the bearer split status request, the SeNB 12 sends a bearer split status response to the MeNB 11. The bearer split status response includes the bearer split status information. Note that steps S13 and S14 are only illustrative. For example, the SeNB 12 may send the bearer split status information periodically or non-periodically, regardless of the request from the MeNB 11.

In step S15, the MeNB 11 performs control (e.g., Layer 1/Layer 2 control) of the access stratum related to the split EPS bearer based on the bearer split status information received from the SeNB 12. As described above, the MeNB 11 may perform control for generation of uplink MAC PDUs (e.g., adjustment of PBR), uplink transmission power control (e.g., adjustment of $P_{EMAX}$), or control for generation of downlink MAC PDUs (e.g., adjustment of PBR). In the example shown in FIG. 6, the MeNB 11 transmits to the UE 2 an RRC Connection Reconfiguration message that contains updated configuration information about uplink transmission (updated UL Tx configuration) regarding the Layer 1/Layer 2 control. The UE 2 performs the Layer 1/Layer 2 control of the access stratum in accordance with the updated configuration information received from the MeNB 11. Accordingly, in step S16, the UE 2 performs uplink, downlink, or bidirectional communication of the split EPS bearer with the MeNB 11 and the SeNB 12 in accordance with the Layer 1/Layer 2 control by the MeNB 11.

In FIG. 6, the roles of the MeNB 11 and the SeNB 12 are interchangeable. Specifically, the MeNB 11 may send to the SeNB 12 the bearer split status information related to the split EPS bearer in the MeNB 11 (PCell 110). Further, the SeNB 12 may perform control of the access stratum in response to receiving the bearer split status information from the MeNB 11 (PCell 110).

As can be seen from the above description, according to this embodiment, the MeNB 11 (or SeNB 12) is configured to receive the bearer split status information from the SeNB 12 (or MeNB 11) and to perform control of the access stratum. In some implementations, the bearer split status information includes communication status information indicating communication status of the split EPS bearer in the SeNB 12. In this case, according to this embodiment, the Layer 1/Layer 2 control of the access stratum is performed based on the communication status information between the MeNB 11 and the SeNB 12. Thus, in this embodiment, when dual connectivity involving a bearer split is performed, unfairness between communication of the split EPS bearer and that of the non-split EPS bearer can be corrected, and generation of MAC PDUs, transmission power control, and the like can be optimized so that they can be performed as intended.

Second Embodiment

In this embodiment, a specific example of the Layer 1/Layer 2 control for uplink transmission, which is included in the control of the access stratum based on sharing of the bearer split status information between the MeNB 11 and the SeNB 12 according to the first embodiment, is described. A configuration example of a radio communication system according to this embodiment is similar to that shown in FIG. 3.

Figure 7:
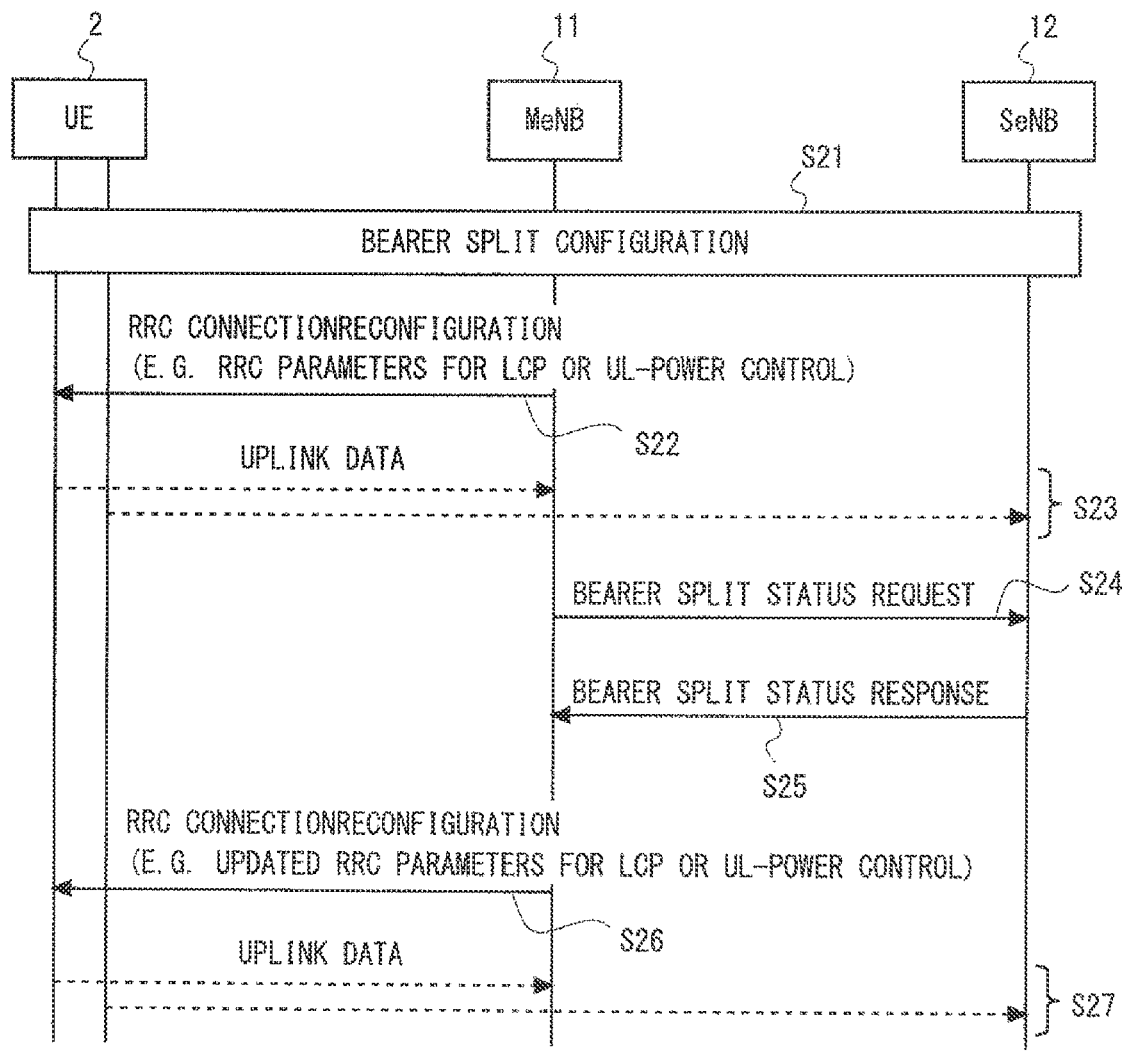
FIG. 7 is a sequence diagram showing an example of a control procedure regarding dual connectivity involving a bearer split according to the second embodiment.

FIG. 7 is a sequence diagram showing an example of the control procedure regarding dual connectivity (e.g., internode radio resource aggregation) involving a bearer split according to this embodiment. The processing of step S21 may be performed in the same manner as the processing of step S11 shown in FIG. 6. Specifically, in step S21, the control procedure for starting dual connectivity involving a bearer split is performed among the MeNB 11, the SeNB 12, and the UE 2.

In step S22, the MeNB 11 transmits a control message for controlling uplink communication of an EPS bearer(s) that is configured in the UE 2 and includes a split EPS bearer. In the example shown in FIG. 7, the MeNB 11 transmits the control message to the UE 2 by using an RRC Connection Reconfiguration message. The control message may include a parameter(s) related to the LCP procedure for generating UL MAC PDUs (e.g., PBR). The control message may also include a control parameter(s) related to the uplink transmission power (e.g., maximum transmission power $P_{EMAX}$ allowed for the UE 2 in the PCell 110 or SCell 120).

In step S23, the UE 2 performs uplink communication of a split EPS bearer with the MeNB 11 and the SeNB 12 in accordance with the control by the MeNB 11 in step S22. Step S23 may include uplink communication of a non-split EPS bearer in the PCell 110.

The processing of steps S24 and S25 may be performed in the same manner as the processing of steps S13 and S14 shown in FIG. 6. Specifically, in step S24, the MeNB 11 sends a bearer split status request to the SeNB 12. In step S25, in response to receiving the bearer split status request, the SeNB 12 sends a bearer split status response including the bearer split status information to the MeNB 11. Instead of performing steps S24 and S25, the SeNB 12 may send the bearer split status information periodically or non-periodically, regardless of the request from the MeNB 11.

In step S26, the MeNB 11 performs uplink Layer 1/Layer 2 control for the split EPS bearer based on the bearer split status information received from the SeNB 12. In the example shown in FIG. 7, the MeNB 11 transmits to the UE 2 an RRC Connection Reconfiguration message containing an updated control message for controlling the uplink communication. The updated control message is generated in consideration of the bearer split status information received from the SeNB 12. For example, the MeNB 11 may update a parameter(s) related to the LCP procedure applied to generation of uplink MAC PDUs (e.g., PBR), or may update a control parameter(s) related to the uplink transmission power (e.g., $P_{EMAX}$) so as to correct the unfairness between communication of the split EPS bearer and communication of the non-split EPS bearer.

In step S27, the UE 2 performs uplink communication of the split EPS bearer with the MeNB 11 and the SeNB 12 in accordance with the control by the MeNB 11 in step S26. Step S26 may include uplink communication of the non-split EPS bearer in the PCell 110.

In FIG. 7, the roles of the MeNB 11 and the SeNB 12 are interchangeable. Specifically, the MeNB 11 may report to the SeNB 12 the bearer split status information related to the split EPS bearer in the MeNB 11 (PCell 110). Further, the SeNB 12 may perform uplink Layer 1/Layer 2 control in response to receiving the bearer split status information from the MeNB 11 (PCell 110).

Figure 8A:
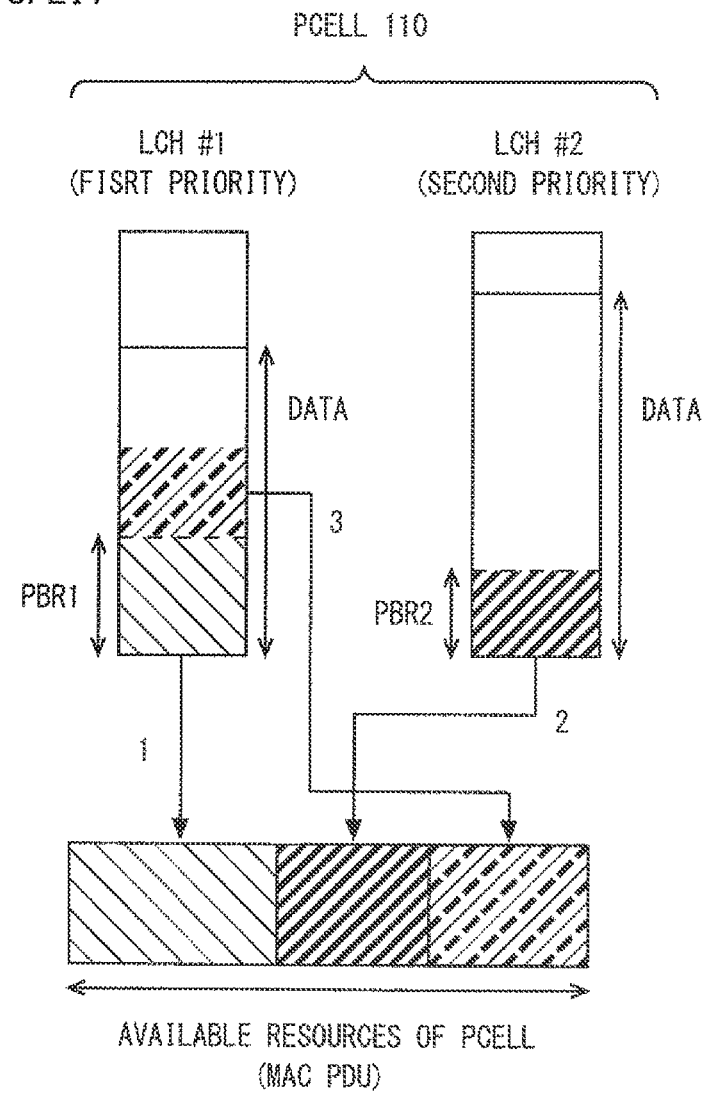
FIG. 8A is a schematic diagram showing an example of generating an uplink MAC PDU when no bearer split is performed.

Next, a specific example of the control for generation of uplink MAC PDUs is described with reference to FIGS. 8A to 8C. FIG. 8A is a schematic diagram showing an example of generating an uplink MAC PDU in the MeNB 11 (PCell 110) when no bearer split is performed. FIG. 8A shows an example in which data from two logical channels (i.e., LCH #1 and LCH #2) is multiplexed on available resources (MAC PDU) indicated by an Uplink Grant from the MeNB 11. The LCH #1 is assigned a highest priority (first priority) and PBR1. The LCH #2 is assigned a second priority and PBR2. In accordance with the uplink PBR procedure specified in the LTE standards, resources up to the PBR1 are first allocated to the LCH #1 which is of the highest priority, and then resources up to the PBR2 are allocated for the LCH #2. After that, the remaining room in the available resources (MAC PDU) is filled with data from the LCH #1 until there is no further data from the LCH #1 which is of the highest priority or there is no further room in the MAC PDU.

Figure 8B:
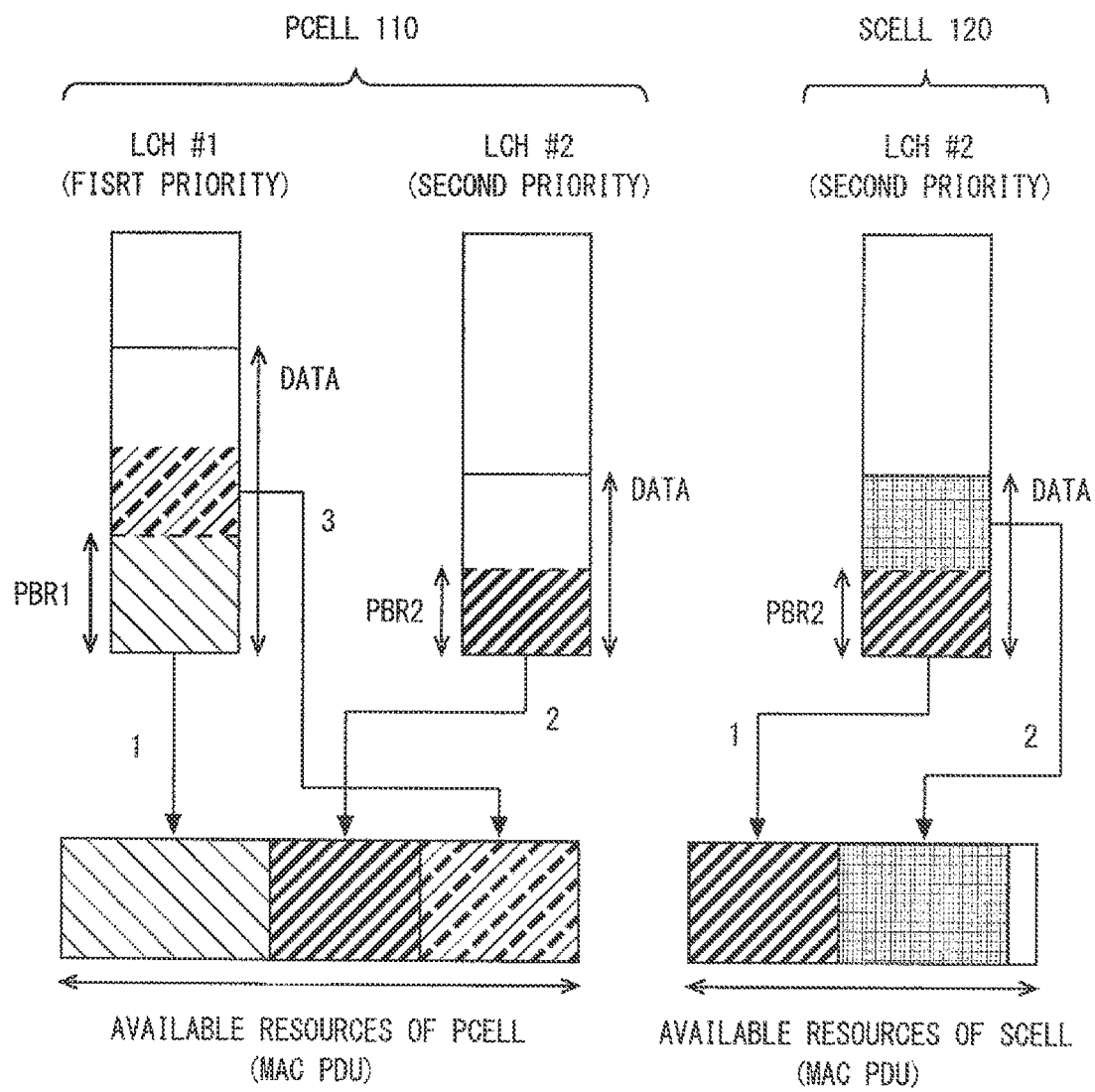
FIG. 8B is a schematic diagram showing an example of generating uplink MAC PDUs when bearer split is performed.

FIG. 8B shows a case where a bearer split is performed on the EPS bearer corresponding to the logical channel LCH #2. In the SCell 120, only the logical channel LCH #2 is configured to the UE 2. Accordingly, uplink resources of the SCell 120 granted to the UE 2 by the SeNB 12 can be used mainly for transmission of data from the logical channel LCH #2. However, in the example shown in FIG. 8B, the PBRs for the logical channels LCH #1 and LCH #2 are the same as those in the example shown in FIG. 8A (i.e., PBR1 and PBR2), and the logical channel LCH #2 of the split EPS bearer is provided with the PBR2 in each of the PCell 110 and the SCell 120. Accordingly, in the example shown in FIG. 8B, the bit rate of the logical channel LCH #2 which is of the second priority is higher than the bit rate of the logical channel LCH #1 which is of the highest priority. This state shows a situation where there is unbalanced resource allocation between the logical channel LCH #1 which is not subjected to a bearer split and the logical channel LCH #2 which is subjected to a bearer split and the LCP procedure does not function as intended.

To overcome the undesirable situation shown in FIG. 8B, the SeNB 12 reports to the MeNB 11 the communication status of the logical channel LCH #2 in the SeNB 12 (SCell 120) or the communication status of the split EPS bearer (or the radio bearer) associated with the logical channel LCH #2. The SeNB 12 may report to the MeNB 11, for example, the throughput of the logical channel LCH #2 in the SeNB 12 (e.g., transmission rate or data rate of PDCP SDUs, PDCP PDUs, RLC PDUs, or MAC PDUs (i.e., Transport Blocks)). The SeNB 12 may report to the MeNB 11 the total uplink throughput of the UE 2 in the SCell 120, instead of the throughput per logical channel (or EPS bearer, radio bearer). The MeNB 11 determines that the throughput of the logical channel LCH #2 related to the split EPS bearer is excessive upon considering the PCell 110 and the SCell 120 as a whole, and thus controls the LCP procedure to correct the excessive throughput of the logical channel LCH #2. Specifically, the MeNB 11 may increase the PBR1 of the logical channel LCH #1 which is not subjected to a bearer split, or may decrease the PBR2 of the logical channel LCH #2 which is subjected to a bearer split, or may perform both increase of the PBR1 and decrease of the PBR2.

Figure 8C:
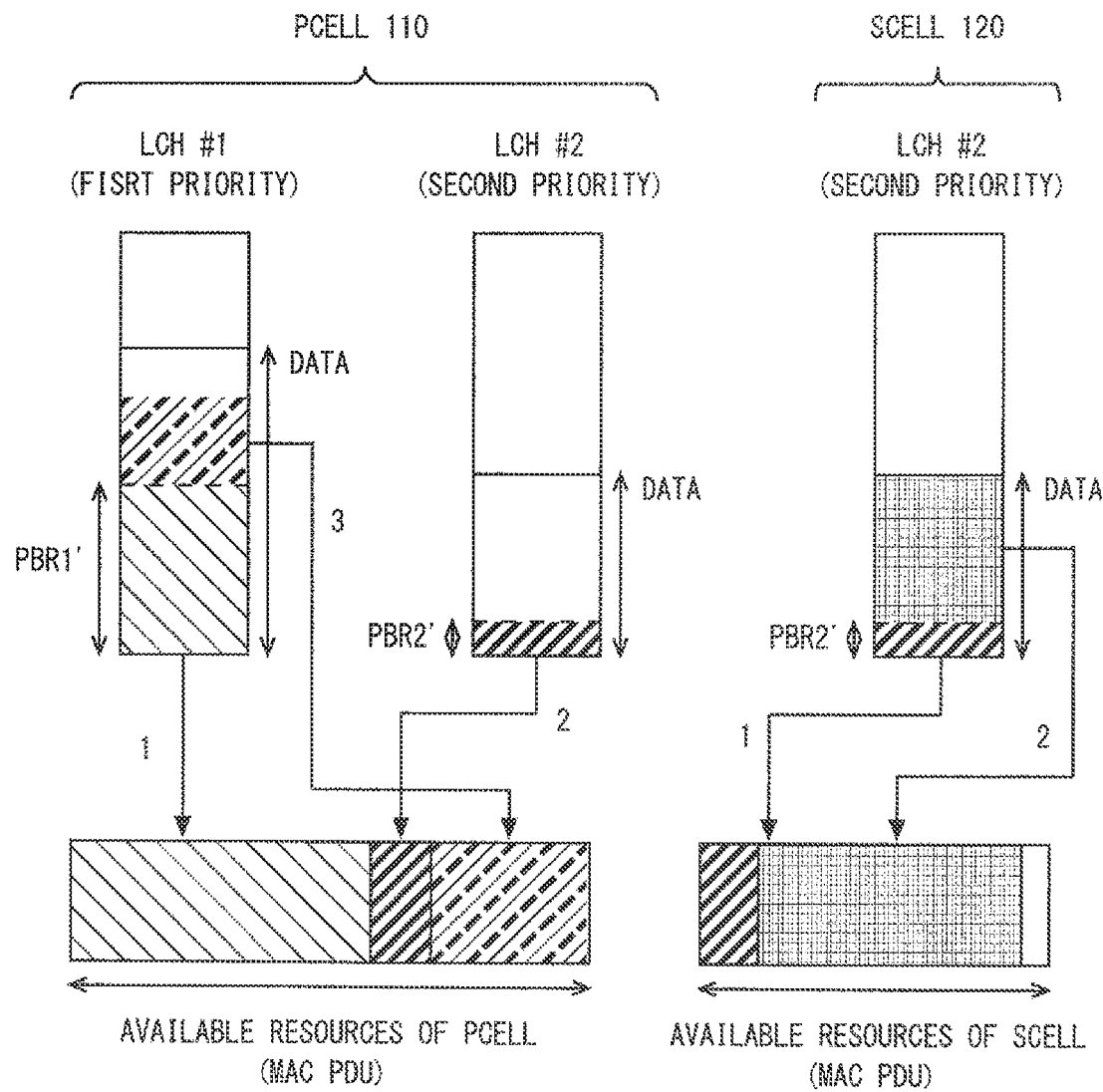
FIG. 8C is a schematic diagram showing an example of generating uplink MAC PDUs when bearer split is performed.

FIG. 8C is a schematic diagram showing an example of generating uplink MAC PDUs after the adjustment of the PBRs. In the example shown in FIG. 8C, the PBR1 of the logical channel LCH #1 which is not subjected to a bearer split is increased to PBR1'. Further, the PBR2 of the logical channel LCH #2 which is subjected to a bearer split is decreased to PBR2'. Accordingly, the bit rate of the logical channel #1 in the PCell 110 increases and the bit rate of the logical channel #2 in the PCell 110 decreases. Thus, upon viewing the PCell 110 and the SCell 120 as a whole, the balance of resource allocation between the logical channel LCH #1 and the logical channel LCH #2 can be brought closer to the intended state. When only data of a radio bearer (RB) associated with one EPS Bearer is transmitted in the SCell 120, all the available resources may be simply allocated to the data of the RB, without executing the LCP algorithm.

The uplink Layer 1/Layer 2 control performed in this embodiment may be uplink transmission power control. In this case, the SeNB 12 may report, to the MeNB 11, information about the power headroom of the UE 2 in the SCell 120 as the communication status information. The information about the power headroom may be statistics, such as an average value of the power headroom, or other information indicating the size of the power headroom. The MeNB 11 may adjust the transmission power of the UE 2 by taking into account both the power headroom of the UE 2 in the PCell 110 and the power headroom of the UE 2 in the SCell 120. For example, as described above, the MeNB 11 may adjust one or both of $P_{EMAX,\ PCELL}$ and $P_{EMAX,\ SCELL}$ when it is determined that the power headroom of the UE 2 in the PCell 110 is less than the power headroom of the UE 2 in the SCell 120 by more than a predetermined amount. Specifically, the MeNB 11 may increase $P_{EMAX,\ PCELL}$ and decrease $P_{EMAX,SCELL}$. $P_{EMAX, PCELL}$ represents the maximum transmission power (i.e., transmit power limit) allowed for the UE 2 in the PCell 110, and $P_{EMAX, SCELL}$ represents the maximum transmission power allowed for the UE 2 in the SCell 120. $P_{EMAX, PCELL}$ and $P_{EMAX, SCELL}$ are used to determine the configured maximum transmission power $P_{CMAX, PCELL}$ in the PCell 110 and $P_{CMAX, SCELL}$ in the SCell 120. $P_{CMAX, PCELL}$ and $P_{CMAX, SCELL}$ may be determined according to the calculation formulas ($P_{CMAX,C}$) specified in 3GPP TS 36.301.

Also in the example of the uplink transmission power control, the roles of the MeNB 11 and the SeNB 12 are interchangeable. Specifically, the MeNB 11 may report, to the SeNB 12, the information about the power headroom of the UE 2 in the PCell 110. Further, the SeNB 12 may adjust the uplink maximum transmission power of the UE 2 in one or both of the PCell 110 and the SCell 120 in consideration of the power headroom of the UE 2 in the PCell 110.

Third Embodiment

In this embodiment, a specific example of the Layer 1/Layer 2 control for downlink transmission, which is included in the control of the access stratum based on sharing of the bearer split status information between the MeNB 11 and the SeNB 12 according to the first embodiment, is described. A configuration example of a radio communication system according to this embodiment is similar to that shown in FIG. 3.

Figure 9:
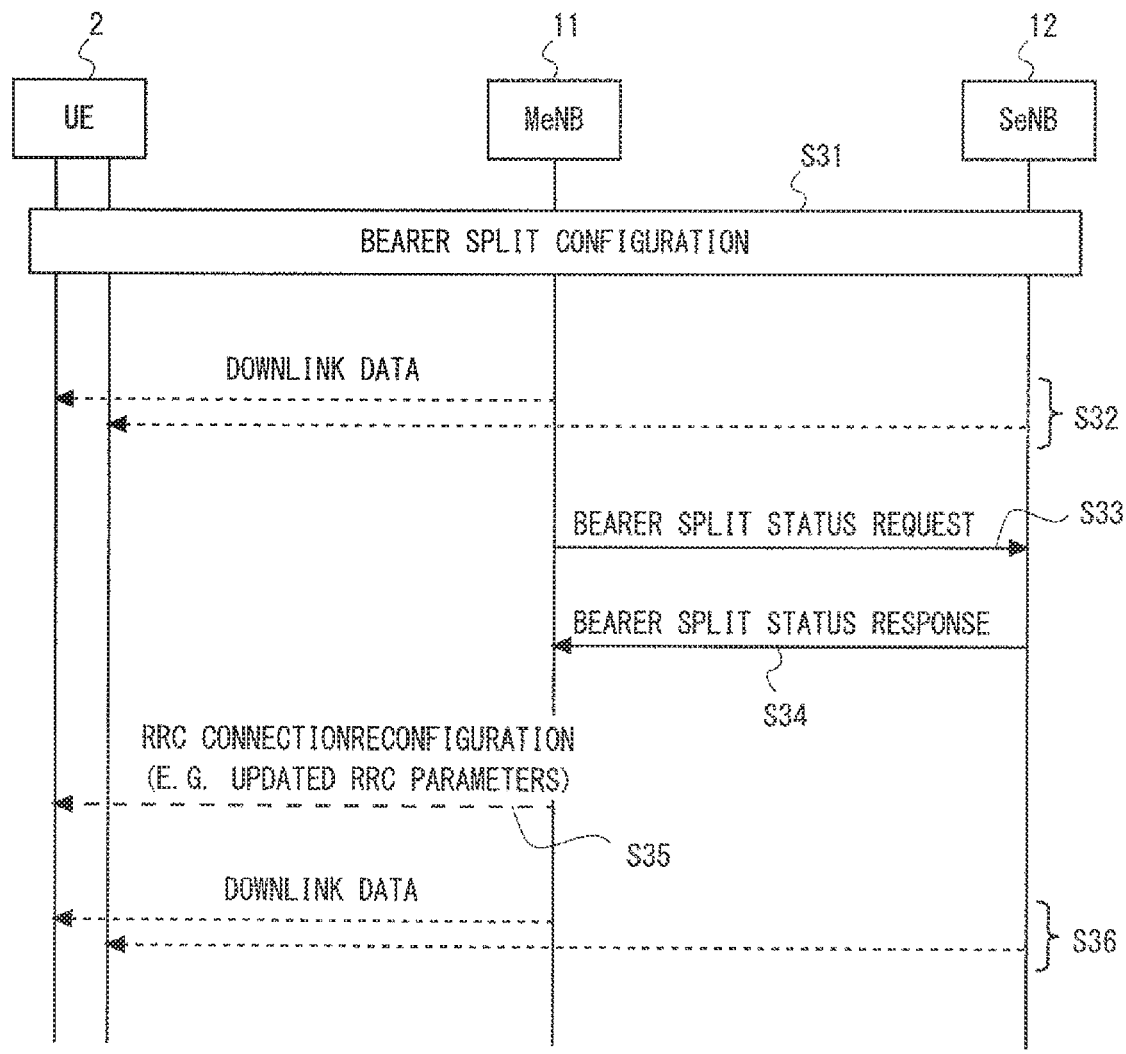
FIG. 9 is a sequence diagram showing an example of a control procedure regarding dual connectivity involving a bearer split according to the third embodiment.

FIG. 9 is a sequence diagram showing an example of the control procedure regarding dual connectivity involving a bearer split according to this embodiment. The processing of step S31 may be performed in the same manner as the processing of step S11 shown in FIG. 6. Specifically, in step S31, the control procedure for starting dual connectivity involving a bearer split is performed among the MeNB 11, the SeNB 12, and the UE 2.

In step S32, the MeNB 11 and the SeNB 12 perform downlink communication of a split EPS bearer with the UE 2. Step S32 may include downlink communication of a non-split EPS bearer in the PCell 110.

The processing of steps S33 and S34 may be performed in the same manner as the processing of steps S13 and S14 shown in FIG. 6. Specifically, in step S33, the MeNB 11 sends a bearer split status request to the SeNB 12. In step S34, in response to receiving the bearer split status request, the SeNB 12 sends a bearer split status response including the bearer split status information to the MeNB 11. Instead of performing steps S33 and S34, the SeNB 12 may send the bearer split status information periodically or non-periodically, regardless of the request from the MeNB 11.

The bearer split status information sent in step S34 may indicate information relating to the downlink communication of the UE 2 in the SCell 120, including communication status information, radio resource control information, or admission control information, or any combination thereof. The communication status information may indicate statistics (e.g., average value) of radio resources (i.e., the number of resource blocks) allocated to the UE 2 in the SCell 120. The communication status information may indicate statistics (e.g., average value) of the throughput (e.g., transmission rate or data rate of PDCP SDUs, PDCP PDUs, RLC PDUs, or MAC PDUs (Transport Blocks)) of the UE 2 in the SCell 120. The communication status information may also indicate a packet loss rate, information about retransmission control in the RLC sublayer, information about packet discarding in the RLC sublayer, and the like.

The radio resource control information may be information about radio resources used in the SCell 120 for data (service) from the split EPS bearer. More specifically, the radio resource control information in the SeNB 12 may include at least one of the following information items (1) to (3):

(1) Information about an increase or decrease in radio resources;
(2) Information about available radio resources; and
(3) Information about surplus radio resources.

The information about an increase or decrease in radio resources may indicate, for example, that the number of radio resources can be increased (or a request to increase the number of radio resources can be made), or the number of radio resources can be reduced (or a request to reduce the number of radio resources can be made), according to the use status or the like of radio resources used for a bearer split (i.e., split EPB bearer) in the SeNB 12.

The information about available radio resources may indicate, for example, radio resources which can be allocated to the data (service) of the split EPS bearer in the SeNB 12.

The information about surplus radio resources may indicate, for example, radio resources which are not used in the SeNB 12 (i.e., radio resources which can be used for data transmission or the like). Examples of the radio resources may include the number of resource blocks, the number of packets (PDCP PDUs, PDCP SDUs, RLC PDUs, RLC SDUs, MAC PDUs (TBs), etc.), and the number of cells (i.e., the number of downlink and/or uplink carriers).

The admission control information may be information relating to admission executed in the SeNB 12 on data (service) of the split EPS bearer (i.e., information about whether a bearer split can be accepted). More specifically, the admission control information in the SeNB 12 may include at least one of the following information items (1) to (5):

(1) Information about whether or not to admit a new bearer split;
(2) information about a wait time until a new bearer split is acceptable;
(3) Information about a wait time until a request for a new bearer split is made;
(4) Information about estimated (expected) throughput (data rate); and
(5) Information about an estimated (expected) amount of radio resources to be allocated.

The information about whether or not to admit a new bearer split may indicate, for example, whether a new bearer split is allowed in the SeNB 12, or the number of new bearer splits that can be allowed in the SeNB 12 (i.e., the number of EPS bearers transmitted by radio bearers (RBs) in a cell of the SeNB 12 in the case of a bearer split).

The information about a wait time until a new bearer split is acceptable may indicate, for example, an expected minimum wait time until a bearer split is acceptable in the SeNB 12, or a wait time until a bearer split is acceptable.

The information about a wait time until a request for a new bearer split is made may indicate, for example, a prohibited time during which sending (by the MeNB 11) a request for a bearer split to the SeNB 12, i.e., sending a request for transmitting data (service) of the split EPS bearer in a cell of the SeNB 12, is prohibited.

The information about an estimated (expected) data rate (throughput) may indicate, for example, an estimated (expected) data rate (e.g., throughput) in the SeNB 12, or a level of a data rate (e.g., throughput) (e.g., an index value indicating one of several predetermined levels of data rates).

The information about an estimated (expected) amount of radio resources to be allocated may indicate, for example, an estimated (expected) amount of radio resources to be allocated in the SeNB 12, or a level of an amount of radio resources (e.g., an index value indicating one of several predetermined levels of the amount of radio resources). Examples of the radio resources may include the number of resource blocks, the number of packets (PDCP PDUs, PDCP SDUs, RLC PDUs, RLC SDUs, MAC PDUs (TBs), etc.), and the number of cells (i.e., the number of downlink and/or uplink carriers).

In step S35, the MeNB 11 may perform the downlink Layer 1/Layer 2 control for the split EPS bearer based on the bearer split status information received from the SeNB 12. As shown in FIG. 9, if necessary, the MeNB 11 may transmit, to the UE 2, an updated control message for controlling the downlink communication, for example, by using the RRC Connection Reconfiguration message. Further, if necessary, the MeNB 11 may transmit the updated control message for controlling the downlink communication to the SeNB 12.

In the downlink Layer 1/Layer 2 control in step S35, the MeNB 11 may update a parameter(s) related to the LCP procedure applied to generation of downlink MAC PDUs (e.g., PBR). For example, when the average value of radio resources allocated to the UE 2 in the SCell 120 is equal to or greater than a predetermined value, the MeNB 11 may decrease the downlink PBR (i.e., prioritized resource amount) for the logical channel of the split EPS bearer of the UE 2 in the PCell 110. Further, the MeNB 11 may increase the downlink PBR for the non-split EPS bearer of the UE 2 in the PCell 110. Accordingly, when dual connectivity involving a bearer split is performed, the unfairness between downlink communication of the split EPS bearer and downlink communication of the non-split EPS bearer can be corrected, and thus generation of MAC PDUs, transmission power control, and the like can be optimized so that they can be performed as intended.

In step S36, the MeNB 11 and the SeNB 12 perform downlink communication of the split EPS bearer with the UE 2 in accordance with the control by the MeNB 11 in step S35. Step S36 may include downlink communication of a non-split EPS bearer in the PCell 110.

In FIG. 9, the roles of the MeNB 11 and the SeNB 12 are interchangeable. Specifically, the MeNB 11 may report to the SeNB 12 the bearer split status information related to the split EPS bearer in the MeNB 11 (PCell 110). Further, the SeNB 12 may perform downlink Layer 1/Layer 2 control in response to receiving the bearer split status information from the MeNB 11 (PCell 110).

Fourth Embodiment

In this embodiment, modified examples of the first to third embodiments are described. A configuration example of a radio communication system according to this embodiment is similar to that shown in FIG. 3. In this embodiment, the SeNB 12 is configured to send to the MeNB 11 a request for a bearer split as described below. According to this configuration, dual connectivity involving a bearer split can be used more effectively.

For example, the SeNB 12 may request the MeNB 11 to increase, decrease, or update the amount of downlink data (e.g., PDCP PDU) on the split EPS bearer that is split in the MeNB 11 and is transmitted to the SeNB 12.

In another alternative, the SeNB 12 may request the MeNB 11 to adjust the maximum transmission power allowed for the UE 2 in the PCell 110 or the SCell 120.

In still another alternative, the SeNB 12 may request the MeNB 11 to adjust the Prioritized Bit Rate (PBR) which is applied to the logical channel of the split EPS bearer when the UE 2 generates the uplink MAC PDUs for the PCell 110 or the SCell 120.

In yet another alternative, the SeNB 12 may request the MeNB 11 to stop the dual connectivity involving a bearer split related to the UE 2.

These requests from the SeNB 12 to the MeNB 11 may be sent periodically or non-periodically (by event-triggered) according to the load of the SeNB 12 (SCell 120), or the characteristics of a physical channel (e.g., Physical Downlink Shared Channel (PDSCH)), a transport channel (e.g., Downlink Shared channel (DL-SCH)), or a logical channel (e.g., Dedicated Traffic channel (DTCH)).

Figure 10:
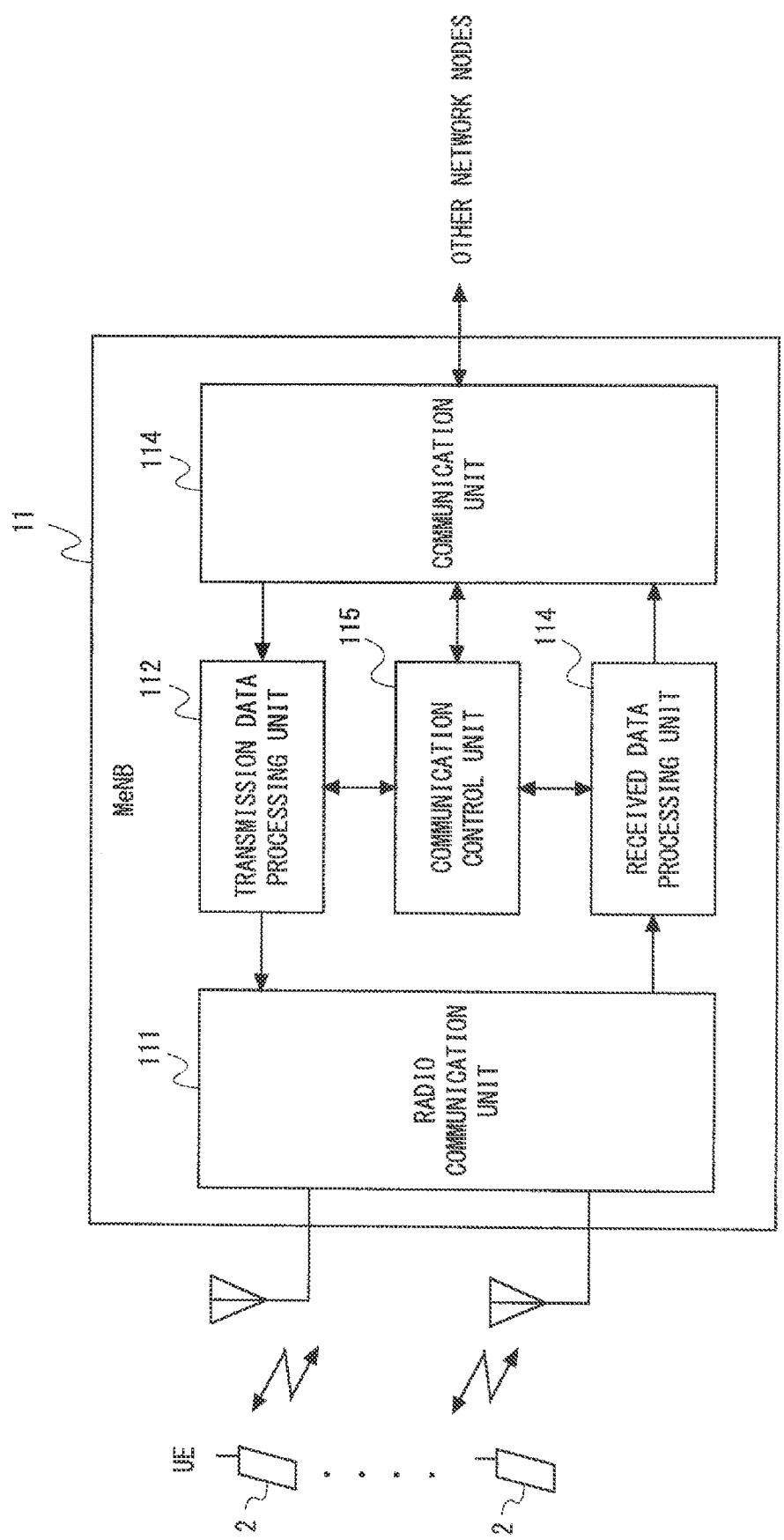
FIG. 10 is a block diagram showing a configuration example of an MeNB according to the first to fourth embodiments.

Next, configuration examples of the MeNB 11, the SeNB 12, and the UE 2 according to the first to fourth embodiments described above are described. FIG. 10 is a block diagram showing a configuration example of the MeNB 11. A radio communication unit 111 receives an uplink signal transmitted from the UE 2 via an antenna. A received data processing unit 113 recovers the received uplink signal. Obtained received data is transferred to other network nodes, such as Serving Gateway (S-GW) or MME of the EPC 3, or another eNB, via a communication unit 114. For example, uplink user data received from the UE 2 is transferred to the S-GW within the EPC 3. NAS control data contained in control data received from the UE 2 is transferred to the MME within the EPC 3. Further, the received data processing unit 113 receives control data to be sent to the SeNB 12 from a communication control unit 115, and sends the received control data to the SeNB 12 via the communication unit 114.

A transmission data processing unit 112 receives user data addressed to the UE 2 from the communication unit 114, and performs error correction coding, rate matching, interleaving, or the like, to thereby generate a transport channel. Further, the transmission data processing unit 112 adds control information to a data sequence of the transport channel, to thereby generate a transmission symbol sequence. The radio communication unit 111 generates a downlink signal by performing processing including carrier wave modulation based on the transmission symbol sequence, frequency conversion, and signal amplification, and transmits the generated downlink signal to the UE 2. The transmission data processing unit 112 receives control data to be transmitted to the UE 2 from the communication control unit 115, and transmits the received control data to the UE 2 via the radio communication unit 111.

The communication control unit 115 controls dual connectivity involving a bearer split. In some implementations, the communication control unit 115 may generate configuration information and control information necessary for dual connectivity involving a bearer split, and may transmit the generated information to the SeNB 12 and the UE 2. Further, the communication control unit 115 may perform control of the access stratum in response to receiving from the SeNB 12 the bearer split status information (e.g., communication status information) related to the split EPS bearer. The communication control unit 115 may send to the SeNB 12 the bearer split status information (e.g., communication status information) related to the split EPS bearer to trigger the control of the access stratum in the SeNB 12.

Figure 11:
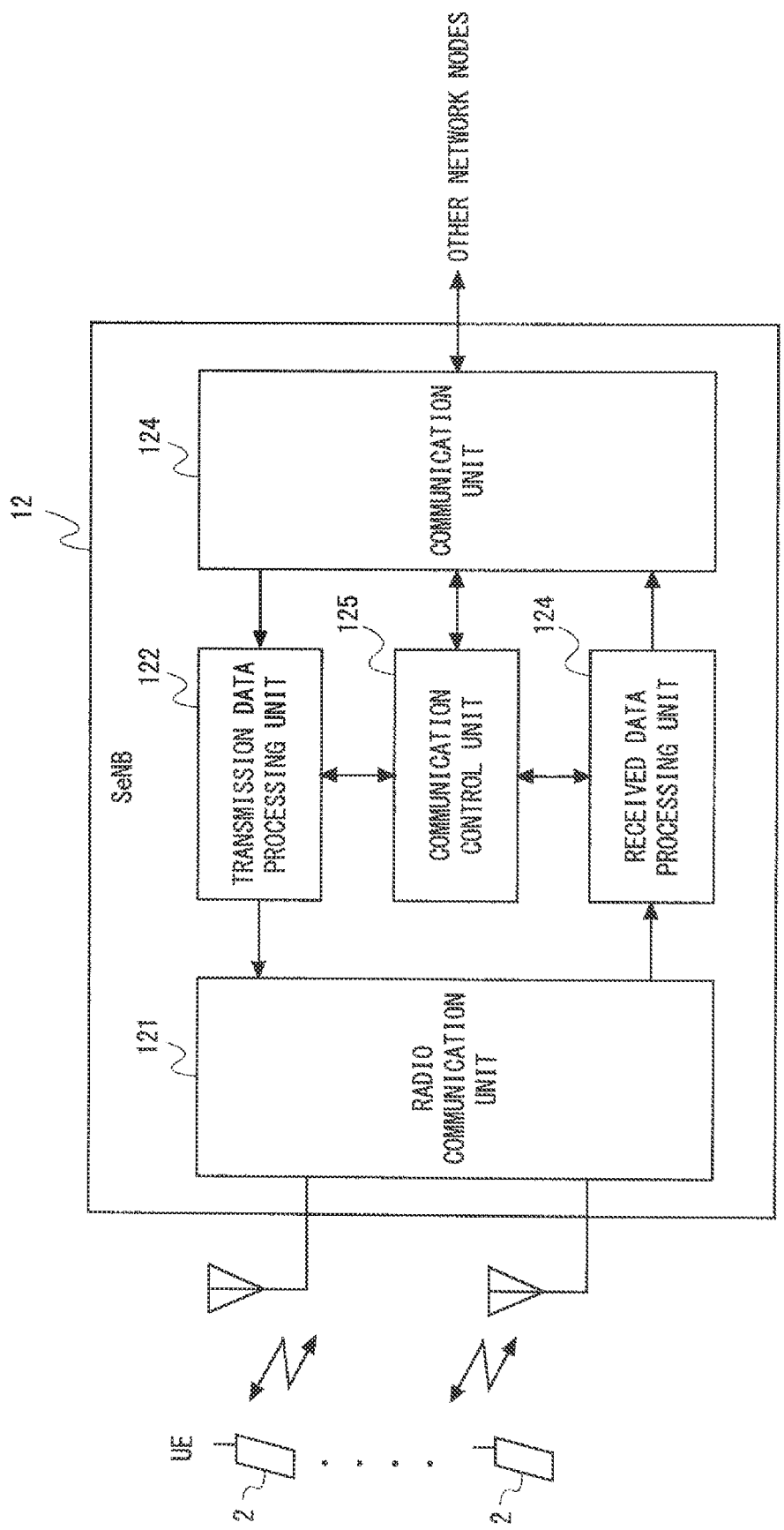
FIG. 11 is a block diagram showing a configuration example of an SeNB according to the first to fourth embodiments.

FIG. 11 is a block diagram showing a configuration example of the SeNB 12. The functions and operations of a radio communication unit 121, a transmission data processing unit 122, a received data processing unit 123, and a communication unit 124, which are shown in FIG. 11, are the same as those of the corresponding elements, i.e., the radio communication unit 111, the transmission data processing unit 112, the received data processing unit 113, and the communication unit 114 in the MeNB 11 shown in FIG. 10.

A communication control unit 125 of the SeNB 12 controls dual connectivity involving a bearer split. The communication control unit 125 may send to the MeNB 11 the bearer split status information (e.g., communication status information) related to the split EPS bearer to trigger the control of the access stratum in the MeNB 11. Further, the communication control unit 125 may perform control of the access stratum in response to receiving from the MeNB 11 the bearer split status information (e.g., communication status information) related to the split EPS bearer.

FIG. 12 is a block diagram showing a configuration example of the UE 2. A radio communication unit 21 is configured to support dual connectivity and to communicate simultaneously in a plurality of cells (PCell 110 and SCell 120) served by different eNBs (MeNB 11 and SeNB 12). Specifically, the radio communication unit 21 receives a downlink signal from one or both of the MeNB 11 and the SeNB 12 via an antenna. A received data processing unit 22 recovers received data from the received downlink signal, and sends the recovered data to a data control unit 23. The data control unit 23 uses the received data according to the intended use. A transmission data processing unit 24 and the radio communication unit 21 generate an uplink signal by using data for transmission supplied from the data control unit 23, and transmit the generated uplink signal to one or both of the MeNB 11 and the SeNB 12.

A communication control unit 25 of the UE 2 controls dual connectivity involving a bearer split. The communication control unit 25 performs control of the access stratum relating to the split EPS bearer based on an instruction from the MeNB 11 or the SeNB 12.

Other Embodiments

The communication control processes in the MeNB 11, the SeNB 12, and the UE 2 in association with dual connectivity involving a bearer split as described in the first to fourth embodiments may be implemented by a semiconductor processing device including an Application Specific Integrated Circuit (ASIC). These processes may be implemented by causing a computer system including at least one processor (e.g., a microprocessor, a Micro Processing Unit (MPU), or a Digital Signal Processor (DSP)) to execute a program. Specifically, one or more programs including instructions for causing the computer system to perform algorithms described above with reference to sequence diagrams and the like may be created, and the program(s) may be supplied to a computer.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), Compact Disc Read Only Memory (CD-ROM CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

In the first to fourth embodiments, the LTE system is mainly described. However, as described above, these embodiments may be applied to radio communication systems other than the LTE system, such as a 3GPP UMIS, a 3GPP2 CDMA2000 system (1xRIT, HRPD), a GSM/GPRS system, or a WiMAX system.

Further, the above embodiments are only illustrative of the application of the technical idea obtained by the present inventor. That is, the technical idea is not limited only to the above embodiments and can be modified in various ways as a matter of course.

This application is based upon and claims the benefit of priority from Japanese patent application No. 2013-227473, filed on Oct. 31, 2013, the disclosure of which is incorporated herein in its entirety by reference.

REFERENCE SIGNS LIST

1 EVOLVED UTRAN (E-UTRAN)
2 USER EQUIPMENT (UE)
3 EVOLVED PACKET CORE (EPC)
11 MASTER eNodeB (MeNB)
12 SECONDARY eNodeB (SeNB)
25 COMMUNICATION CONTROL UNIT
110 PRIMARY CELL (PCell)
120 SECONDARY CELL (SCell)
115 COMMUNICATION CONTROL UNIT
125 COMMUNICATION CONTROL UNIT

The invention claimed is:

1. A radio terminal to be used in a radio communication system, the radio terminal comprising:
a memory storing instructions; and
at least one hardware processor configured to process the instructions to:
perform dual connectivity using a first cell served by a first radio station and a second cell served by a second radio station,
receive, on the first cell, power configuration information related to transmission power configuration of Uplink transmission on the first cell and Uplink transmission on the second cell, from the first radio station, and
transmit a first Power Headroom for the first cell and a second Power Headroom for the second cell to at least the second radio station, wherein:
the power configuration information includes information for maximum transmission power on the first cell and information for maximum transmission power on the second cell,
the radio terminal is configured to receive the maximum transmission power in the second cell which is adjusted by the first radio station in response to a request by the second radio station, and
the request indicates that the second radio station requires adjustment of the maximum transmission power allowed for the radio terminal in the second cell.

2. A first radio station configured to serve a first cell, comprising:

a memory storing instructions; and
at least one hardware processor configured to process the instructions to:
control a radio terminal to perform dual connectivity using the first cell and a second cell served by a second radio station, and
transmit, to the radio terminal which transmits to at least the second radio station a first Power Headroom for the first cell and a second Power Headroom for the second cell, power configuration information related to transmission power configuration of Uplink transmission on the first cell and Uplink transmission on the second cell, wherein:
the power configuration information includes information for maximum transmission power on the first cell and information for maximum transmission power on the second cell,
the first radio station is configured to receive a request from the second radio station and, in response to the request, adjust the maximum transmission power allowed for the radio terminal in the second cell, and
the request indicates that the second radio station requires adjustment of the maximum transmission power allowed for the radio terminal in the second cell.

3. A second radio station configured to serve a second cell, comprising:
a memory storing instructions; and
at least one hardware processor configured to process the instructions to:
communicate with a radio terminal which performs dual connectivity using a first cell served by a first radio station and the second cell,
control a part of power configuration information related to transmission power configuration of Uplink transmission on the first cell and Uplink transmission on the second cell, and
receive a first Power Headroom for the first cell and a second Power Headroom for the second cell from the radio terminal, wherein:
the power configuration information includes information for maximum transmission power on the first cell and information for maximum transmission power on the second cell,
the second radio station is configured to send a request to the first radio station to adjust the maximum transmission power allowed for the radio terminal in the second cell, and
the request indicates that the second radio station requires adjustment of the maximum transmission power allowed for the radio terminal in the second cell.

4. A radio communication system, comprising:
a first radio station configured to serve a first cell;
a second radio station configured to serve a second cell; and
a radio terminal configured to perform Dual Connectivity using the first cell and the second cell, wherein
the first radio station is configured to transmit, on the first cell, power configuration information related to transmission power configuration of Uplink transmission on the first cell and Uplink transmission on the second cell, and
the radio terminal is configured to transmit a first Power Headroom for the first cell and a second Power Headroom for the second cell to at least the second radio station, wherein:
the power configuration information includes information for maximum transmission power on the first cell and information for maximum transmission power on the second cell,
the second radio station is configured to send a request to the first radio station to adjust the maximum transmission power allowed for the radio terminal in the second cell, and
the request indicates that the second radio station requires adjustment of the maximum transmission power allowed for the radio terminal in the second cell.

5. A communication control method in a radio terminal that is used in a radio communication system, the communication control method comprising:
performing dual connectivity using a first cell served by a first radio station and a second cell served by a second radio station;
receiving, on the first cell, power configuration information related to transmission power configuration of Uplink transmission on the first cell and Uplink transmission on the second cell, from the first radio station; and
transmitting a first Power Headroom for the first cell and a second Power Headroom for the second cell to at least the second radio station, wherein:
the power configuration information includes information for maximum transmission power on the first cell and information for maximum transmission power on the second cell,
the maximum transmission power in the second cell is adjusted by the first radio station in response to a request by the second radio station, and
the request indicates that the second radio station requires adjustment of the maximum transmission power allowed for the radio terminal in the second cell.

6. A communication control method in a first radio station serving a first cell, comprising:
controlling a radio terminal to perform dual connectivity using the first cell and a second cell served by a second radio station; and
transmitting, to the radio terminal which transmits to at least the second radio station a first Power Headroom for the first cell and a second Power Headroom for the second cell, power configuration information related to transmission power configuration of Uplink transmission on the first cell and Uplink transmission on the second cell, wherein:
the power configuration information includes information for maximum transmission power on the first cell and information for maximum transmission power on the second cell,
the method further comprises receiving from the second radio station a request and, in response to the request, adjusting the maximum transmission power allowed for the radio terminal in the second cell, and
the request indicates that the second radio station requires adjustment of the maximum transmission power allowed for the radio terminal in the second cell.

7. A communication control method in a second radio station serving a second cell, comprising:
communicating with a radio terminal which performs dual connectivity using a first cell served by a first radio station and the second cell;
controlling a part of power configuration information related to transmission power configuration of Uplink transmission on the first cell and Uplink transmission on the second cell; and receiving a first Power Headroom for the first cell and a second Power Headroom for the second cell from the radio terminal, wherein:

the power configuration information includes information for maximum transmission power on the first cell and information for maximum transmission power on the second cell, the part of the power configuration information includes the information for the maximum transmission power on the second cell, the method further comprises sending a request to the first radio station to adjust the maximum transmission power allowed for the radio terminal in the second cell, and the request indicates that the second radio station requires adjustment of the maximum transmission power allowed for the radio terminal in the second cell.

8. The first radio station according to claim 2, wherein the power configuration information is used, by the radio terminal, to calculate at least one of the first Power Headroom and the second Power Headroom.

9. The communication method according to claim 6, wherein the power configuration information is used, by the radio terminal, to calculate at least one of the first Power Headroom and the second Power Headroom.

* * * * *